US008775796B2

(12) United States Patent
Karasawa et al.

(10) Patent No.: US 8,775,796 B2
(45) Date of Patent: Jul. 8, 2014

(54) CERTIFICATE AUTHENTICATING METHOD, CERTIFICATE ISSUING DEVICE, AND AUTHENTICATION DEVICE

(75) Inventors: Kei Karasawa, Tokyo (JP); Masahisa Kawashima, Tokyo (JP); Yukio Tsuruoka, Tokyo (JP); Kenji Takahashi, Tokyo (JP); Shingo Orihara, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1114 days.

(21) Appl. No.: 12/523,420

(22) PCT Filed: Feb. 7, 2008

(86) PCT No.: PCT/JP2008/052054
§ 371 (c)(1),
(2), (4) Date: Aug. 7, 2009

(87) PCT Pub. No.: WO2008/096825
PCT Pub. Date: Aug. 14, 2008

(65) Prior Publication Data
US 2011/0185171 A1 Jul. 28, 2011

(30) Foreign Application Priority Data

Feb. 7, 2007 (JP) ................................. 2007-027985

(51) Int. Cl.
*H04L 9/32* (2006.01)
(52) U.S. Cl.
USPC ......................................................... 713/156
(58) Field of Classification Search
CPC ........................... H04L 9/3263; H04L 63/0823
USPC ........................................................ 713/156
See application file for complete search history.

(56) References Cited

U.S. PATENT DOCUMENTS

2003/0142673 A1 7/2003 Patil et al.
2006/0291422 A1 12/2006 Rochford
(Continued)

FOREIGN PATENT DOCUMENTS

JP 2003-188873 7/2003
JP 2004-272380 9/2004
(Continued)

OTHER PUBLICATIONS

Ishihara, T. et al.,"Web Authentication System by Digital Certificate With Unique Information of Hardware", Computer Security Symposium 2001, vol. 2001, No. 15, pp. 223-228 (2001).

(Continued)

*Primary Examiner* — Matthew Smithers
(74) *Attorney, Agent, or Firm* — Oblon, Spivak, McClelland, Maier & Neustadt, L.L.P.

(57) ABSTRACT

A terminal device 4 transmits a certificate issue request including a communication ID thereof and a sub ID to a certificate issuing device 7 via a NW1 (a first network). The certificate issuing device 7 inquires of a communication ID (identifier) checking device 5 whether or not the communication ID included in the certificate issue request is in use or not and inquires of a communication ID/sub ID checking device 6 whether or not the communication ID and the sub ID are associated with each other. If both the check results are OK, the certificate issuing device 7 generates a certificate including the ID of the certificate issuing device 7, the communication ID, the sub ID and a validity period and transmits the certificate to the terminal device 4. In this way, a certificate with a short validity period can be issued only based on the access to the NW1 using the communication ID and the sub ID.

22 Claims, 25 Drawing Sheets

(56) References Cited

U.S. PATENT DOCUMENTS

| | | | |
|---|---|---|---|
| 2007/0112948 A1* | 5/2007 | Uhlik | 709/223 |
| 2007/0198830 A1* | 8/2007 | Imai | 713/156 |
| 2008/0120713 A1* | 5/2008 | Lo et al. | 726/10 |
| 2009/0133118 A1* | 5/2009 | Beattie et al. | 726/17 |
| 2010/0063929 A1* | 3/2010 | Torigai et al. | 705/44 |

FOREIGN PATENT DOCUMENTS

| | | | | |
|---|---|---|---|---|
| JP | 2004-343442 | | 12/2004 | |
| JP | 2005-339093 | | 12/2005 | |
| JP | 2006 25010 | | 1/2006 | |
| JP | 2006-025010 | * | 1/2006 | H04L 12/66 |
| JP | 2007-323326 | | 12/2007 | |
| JP | 2008-15934 | | 1/2008 | |
| JP | 2008-541242 | | 11/2008 | |
| WO | WO 2005/011192 | | 2/2005 | |
| WO | WO 2006/032826 A1 | | 3/2006 | |

OTHER PUBLICATIONS

Kui Ren, et al., "Routing optimization security in mobile IPv6", Computer Networks, vol. 50, No. 13, XP025182803, Sep. 15, 2006, pp. 2401-2419.

Fend Bao, et al., "A Scheme for the security between Mobile Node and Mobility Anchor Point in Hierarchical Mobile IPv6", <draft-qiu-mipshop-mn-map-security-00.txt>, XP015042984, Oct. 16, 2005, pp. 1-11.

Tuomas Aura, et al., "Reducing Reauthentication Delay in Wireless Networks", Proceedings of the First International Conference on Security and Privacy for Emerging Areas in Communications Networks, IEEE Computer Society, XP010902879, Sep. 5, 2005, pp. 139-148.

S. Mizuno, et al., "PKI Support in Hierarchical Mobile IPv6", Mobile IP Working Group, XP015032544, Oct. 1, 2003, pp. 1-12.

* cited by examiner

CERTIFICATE AUTHENTICATING METHOD, CERTIFICATE ISSUING DEVICE, AND AUTHENTICATION DEVICE

TECHNICAL FIELD

The present invention relates to a certificate authenticating method that authenticates a certificate issued to be used for using a service on a different network, a certificate issuing device and an authentication device.

BACKGROUND ART

There have been prevailed communication services that use communication IDs of terminals for authentication to ensure simplicity and security of the communication services. Each terminal retains addresses of the communication services in which the user participates and authentication information, such as the user IDs and the passwords, that enable the user to use the services. This allows the user to securely use a plurality of communication services. However, in the case where a terminal accesses a communication service via an access NW (network) different from the one that the terminal ordinarily uses to access the communication service, for example, in the case where the terminal accesses the communication service at a roaming location, a problem arises that the original communication ID cannot be used, and the user cannot use the service. Similarly, in the case where a sub ID, which is different from the original communication ID, is used to establish communication, the problem arises that the user cannot use the service.

PRIOR ART

To solve the problem, there is a scheme that allows a terminal to use a service on a new access NW based on the result of previous authentication of the terminal on another access NW that is reliable. The single sign-on scheme involves forwarding the authentication result by an assertion and requires only one authentication to use a plurality of communication services. However, an assertion can be used only on-line, and therefore, there remains the problem that the user cannot use the service when the originally used communication ID cannot be used or a sub ID different from the original communication ID is used to establish communication.

In addition, there is proposed a method of issuing a certificate and including the authentication result from a communication service in the certificate. The patent literature 1 proposes that an IPv6 router, which is a NW service authentication device on an IPv6 network, authenticates a NW access terminal, and an authentication station connected to the NW service authentication device issues a digital certificate that indicates the authentication result to the NW access terminal, thereby enabling the NW access terminal to be automatically authenticated based on the digital certificate when the NW access terminal is to receive authentication for a service on an IPv4 network. However, according to the proposition, the NW service authentication device and the digital certificate issuing device have to be directly connected to each other, and another NW service authentication device has to be able to directly communicate with the digital certificate issuing device via a secure communication path. However, the NW service authentication device, the digital certificate issuing device and the other NW service authentication device may be managed separately, and in such a case, it is difficult for them to be directly connected to each other or directly communicate with each other.

Patent literature 1: Japanese Patent Application Laid-Open No. 2006-25010

DISCLOSURE OF THE INVENTION

Problem to be Solved by the Invention

An object of the present invention is to provide a certificate authenticating method that allows a terminal device capable of connecting to a communication service on a first network by using a communication ID to connect to a communication service in a second network using the same communication ID, and also to provide a certificate issuing device and an authentication device.

Means to Solve the Problems

According to a first aspect of the present invention, a certificate authenticating method that authenticates a terminal device capable of connecting to a first network by using a communication ID to allow the terminal device to connect a second network, comprises:

(a) a step of the terminal device transmitting a certificate issue request to a certificate issuing device via the first network; and (b) a step of the certificate issuing device requesting a communication ID checking device to check whether or not the communication ID of the terminal device included in the certificate issue request is in use when the certificate issue request is received from the terminal device via the first network, generating a certificate including at least an ID of the certificate issuing device, the communication ID of the terminal device and a validity period if at least the check result from the communication ID checking device is OK, and transmitting the certificate to the terminal device.

According to a second aspect of the present invention, a certificate issuing device that issues a certificate that allows a terminal device capable of connecting to a first network by using a communication ID to connect a second network comprises:

communication ID check requesting means that is configured to request a communication ID checking device to check whether or not the communication ID of the terminal device included in a certificate issue request is in use when the certificate issue request is received from the terminal device via the first network; and certificate generating means that is configured to generate a certificate including at least an ID of the certificate issuing device, the communication ID of the terminal device and a validity period if at least the check result from the communication ID checking device is OK and transmit the certificate to the terminal device.

According to a third aspect of the present invention, an authentication device that is configured to authenticate a terminal device capable of connecting to a first network by using a communication ID to allow the terminal device to connect to a second network comprises:

storing means;

challenge generating means that is configured to generate a challenge when an authentication request is received from the terminal device, retain the challenge in the storing means and transmit the challenge to the terminal device via the second network;

response validating means that is configured to receive a response to the challenge, a public key of the terminal device and a certificate with a validity period from the terminal device via the second network and validate the response using the public key of the terminal device and the challenge retained in the storing means; and validity period determining means that is configured to determine whether or not the validity period of the certificate is expired, and transmit an OK authentication result to the terminal device via the second network if the validation succeeds, and it is determined that the validity period is not expired.

According to the present invention, the need of certificate validity check can be eliminated by a technique of issuing and using a certificate with a designated validity period, so that authentication means can be used when connection to a communication service cannot be established. The technique of issuing a disposable certificate is implemented by combining (a) a technique of issuing a certificate with a short validity period, which is implemented by online certificate issue, and (b) a certificate using technique that can limit the number of authentications by retaining the usage history on the system for the short validity period of the certificate.

In the case where communication IDs managed by a wide-area service provider, such as telephone numbers, and sub IDs managed independently by an organization, such as sub numbers, are associated with each other, a technique according to the present invention is to carry out authentication by making communication ID managing means and sub ID managing means cooperate with each other. For example, in the case where a communication network function that manages telephone numbers and a local area function that manages sub numbers cooperate with each other, the cooperation is achieved by the local area function and the communication network function using cooperative IDs to exchange information about their status. In the case where an ISP function that manages global IP addresses and an in-house function that manages private IP addresses cooperate with each other, the cooperation is achieved by obtaining information about the status of the NAT function that carries out conversion between global IP addresses and private IP addresses and the status of the DHCP function.

Effects of the Invention

According to the present invention, even in the case where a NW access terminal cannot use information retained in a NW service relay device, a third party institution issues a digital certificate that proves that the NW access terminal can use information retained in the NW service relay device, thereby enabling the NW access terminal to be authenticated for another NW service.

In addition, even in the case where a NW service authentication device, a digital certificate issuing device and another NW service authentication device are managed separately, a NW access terminal can mediate in the communication therebetween to obtain a digital certificate and thus can obtain authentication for another NW service.

BEST MODES FOR CARRYING OUT THE INVENTION

In the following, embodiments of the present invention will be described with reference to the drawings.

First Embodiment

Figure 1:
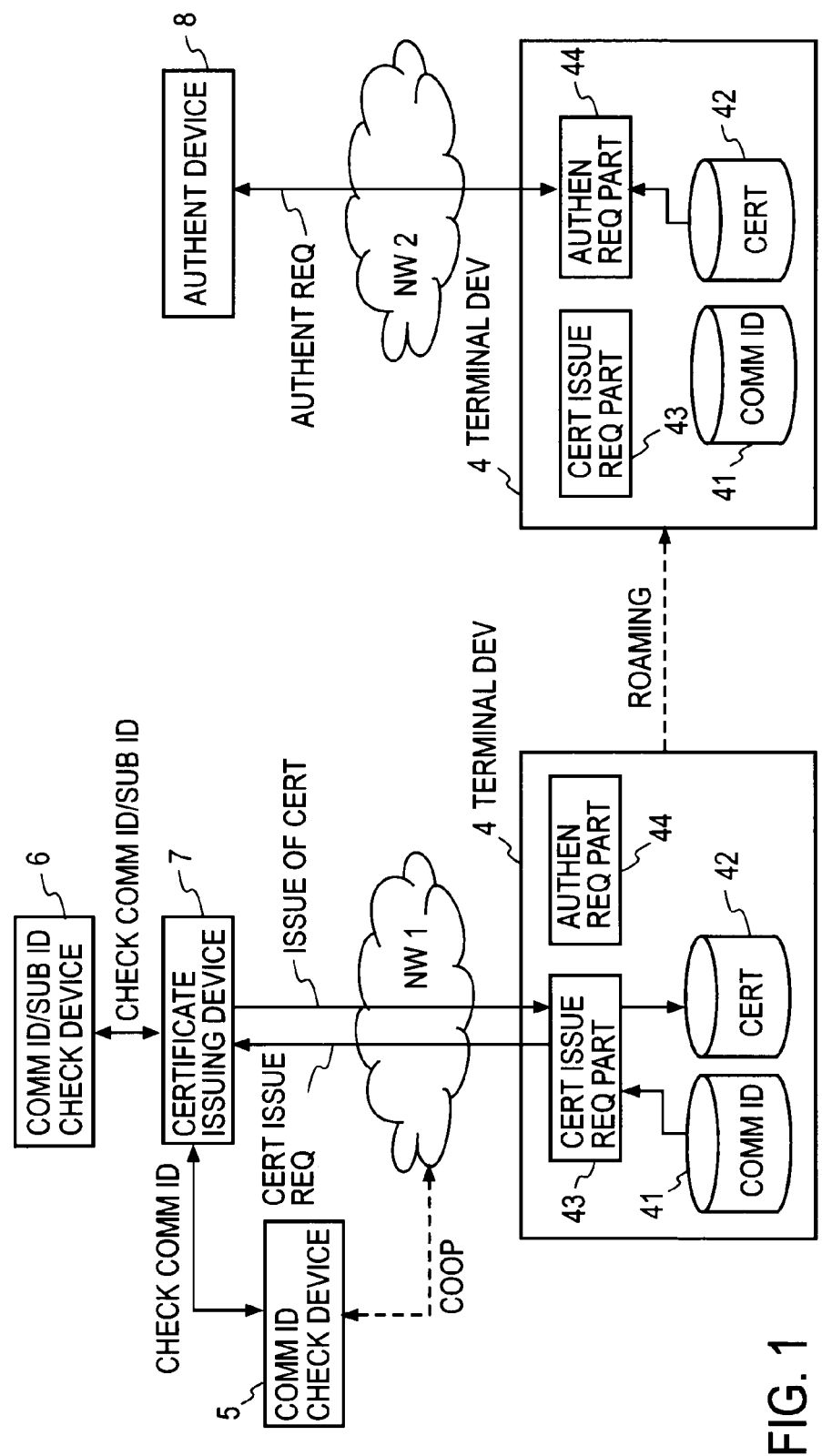
FIG. 1 is a block diagram showing a configuration of a certificate issuing system according to a first embodiment of the present invention.

FIG. 1 shows a configuration of a certificate issuing system according to a first embodiment of the present invention. In this drawing, reference symbols NW1 and NW2 each denote a communication network, reference numeral 4 denotes a terminal device, reference numeral 5 denotes a communication ID checking device, reference numeral 6 denotes a communication ID/sub ID checking device, reference numeral 7 denotes a certificate issuing device, and reference numeral 8 denotes an authentication device. In the example shown in FIG. 1, the communication ID checking device 5 and the communication ID/sub ID checking device 6 are connected directly to the certificate issuing device 7. Alternatively, however, either or both thereof can be connected to the certificate issuing device 7 via the network NW1.

The networks NW1 and NW2 (referred to simply as NW1 and NW2, respectively, hereinafter) are wide area networks, such as the public telephone network and the Internet, and are different communication networks for which the same communication ID cannot be used. The certificate issuing device 7 is connected to the NW1, and the authentication device 8 is connected to the NW2, whereas the terminal device 4 can be used on any of the NW1 and NW2.

The terminal device 4 can communicate with a device connected to a particular network, the NW2 in this example, using a sub ID that is different from the communication ID thereof in the NW1. Specifically, the terminal device 4 is a telephone or a personal computer connected to the NW1 via PBX, HGW or the like (not shown) and has a communication ID storing part 41, a certificate storing part 42, a certificate issue requesting part 43 and an authentication requesting part 44.

The communication ID storing part 41 stores the communication ID (the global IP address, for example) in the NW1. The certificate storing part 42 stores a certificate issued by the certificate issuing device 7 and a key pair, specifically, a public key and a private key, in the terminal device 4.

The certificate issue requesting part 43 reads the communication ID from the communication ID storing part 41, transmits a certificate issue request including at least the (separately stored) sub ID (private IP address, for example) along with the communication ID to the certificate issuing device 7 via the NW1, receives a certificate transmitted from the certificate issuing device 7 via the NW1 and retains the certificate in the certificate storing part 42.

The authentication requesting part 44 transmits an authentication request insulating including at least the sub ID to the authentication device 8 via the NW2. Then, when the authentication requesting part 44 receives a challenge from the authentication device 8 via the NW2, the authentication requesting part 44 determines whether the authentication request is the first one. If the authentication request is the first one, the authentication requesting part 44 generates a response to the challenge using the private key of the terminal device 4, reads the certificate from the certificate storing part 42 and transmits the certificate, the public key of the terminal device 4 and the response to the authentication device 8 via the NW2. If the authentication request is the second or subsequent one, the authentication requesting part 44 generates a response to the challenge using the private key of the terminal device 4, transmits the response and the public key of the terminal device 4 to the authentication device 8 via the NW2, and receives the authentication result transmitted from the authentication device 8 via the NW2.

The communication ID checking device 5 checks whether or not a predetermined communication ID in the NW1 is in use by cooperating with an exchange or an internet service provider (ISP) (not shown) on the NW1. The check is carried out in response to an external request, for example, a request from the certificate issuing device 7. If the communication ID is in use, the communication ID checking device 5 sends back the OK check result. Otherwise, the communication ID checking device 5 sends back the NG check result.

The communication ID/sub ID checking device 6 checks whether or not a predetermined sub ID and a predetermined communication ID in the NW1 are associated with each other. The check is carried out in response to an external request, for example, a request from the certificate issuing device 7. If the sub ID and the communication ID are associated with each other, the communication ID/sub ID checking device 6 sends back the OK check result. Otherwise, the communication ID/sub ID checking device 6 sends back the NG check result.

Figure 2A:
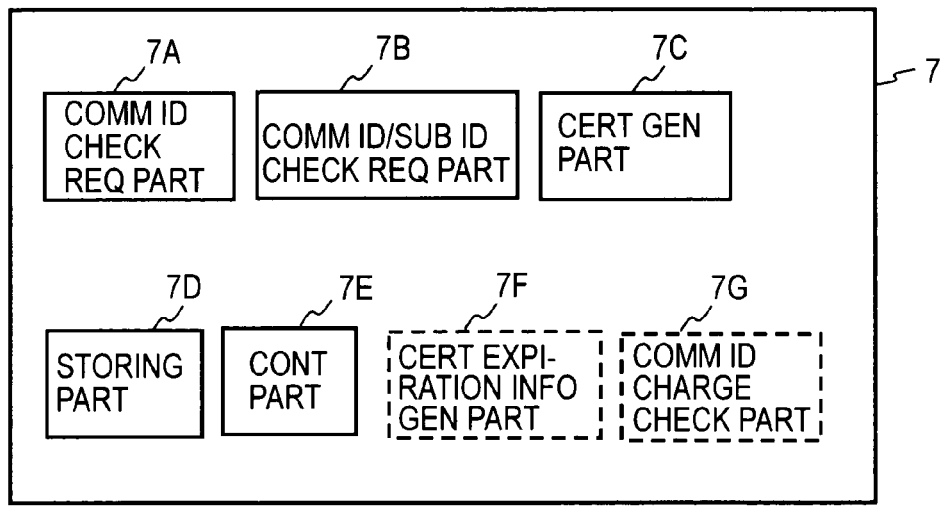
FIG. 2A is a block diagram showing an exemplary functional configuration of a certificate issuing device.

As shown in FIG. 2A, the certificate issuing device 7 includes a communication ID check requesting part 7A, a communication ID/sub ID check requesting part 7B, a certificate generating part 7C, a storing part 7D and a controlling part 7E. When a certificate issue request including at least the sub ID and the communication ID is received from the terminal device 4 via the NW1, the communication ID check requesting part 7A requests the communication ID checking device 5 to check whether or not the communication ID included in the certificate issue request is in use. In addition, the communication ID/sub ID check requesting part 7B requests the communication ID/sub ID checking device 6 to check whether or not the communication ID and the sub ID included in the certificate issue request are associated with each other.

Figure 2B:
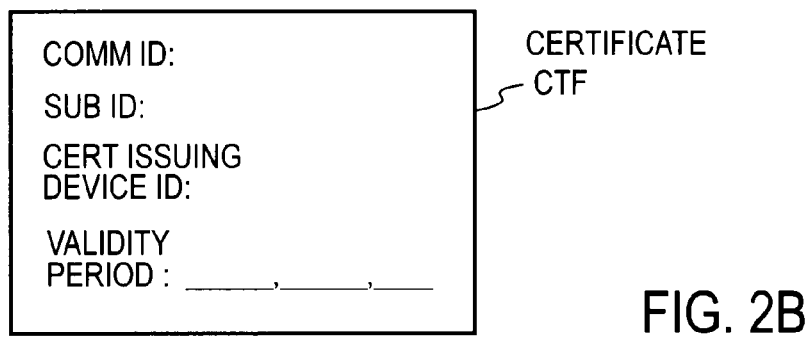
FIG. 2B is a sequence diagram for illustrating an exemplary certificate.

If both the check results from the communication ID checking device 5 and the communication ID/sub ID checking device 6 are OK, the certificate generating part 7C generates a certificate CTF including at least the communication ID and sub ID of the terminal device 4, the ID of the certificate issuing device and the validity period (which is typically short, such as one to two days) as shown in FIG. 2B and transmits the certificate to the terminal device 4 via the NW1. If either of the check results is NG, the terminal device 4 is informed that the issue is denied via the NW1.

The storing part 7D previously stores information required for communication with the terminal device, information required for generation of the certificate or the like or stores information used in the certificate issuing process as required. The controlling part 7E controls the communication between the certificate issuing device 7 and other devices (the terminal device 4, the communication ID checking device 5 and the communication ID/sub ID checking device 6) and processings carried out by the communication ID check requesting part 7A, the communication ID/sub ID check requesting part 7B, the certificate generating part 7C and the storing part 7D.

The authentication device 8 includes a challenge generating part 8A, a storing part 8B, a response validating part 8C, a validity period determining part 8D and a controlling part 8E. When an authentication request including at least the sub ID, for example, is received from the terminal device 4 via another network, the NW2 in this example, the challenge generating part 8A generates a challenge based on the well-known challenge and response method used for authentication, stores the challenge in the storing part 8B and transmits the challenge to the terminal device 4 via the NW2.

The authentication device 8 receives the response to the challenge, the public key of the terminal device 4 and the certificate CTF from the terminal device 4 via the NW2 and stores them in the storing part 8B. Furthermore, the response validating part 8C validates the received response using the public key of the terminal device 4 and the stored challenge. If the validation succeeds, the validity period determining part 8D determines whether the date of reception is within the validity period included in the certificate CTF. If the date of reception is within the validity period, the OK authentication result for the certificate CTF is transmitted to the terminal device 4 via the NW2. If the response validation fails, the NG authentication result is transmitted to the terminal device 4.

In the case where the authentication device 8 transmits the OK authentication result to the terminal device 4, in this system, the terminal device 4 can connect to a desired service providing server (not shown) on the NW2 via the authentication device using the sub ID. If the terminal device 4 is to directly connect to a desired service providing server on the NW2, the authentication device 8 can transmit the OK authentication result and a digital signature of the authentication device 8 to the terminal device 4, and the terminal device 4 can present the digital signature to connect to the desired service providing server using the sub ID, for example. As described above, the terminal device 4 can connect to a desired service providing server on the NW2 using the sub ID.

The controlling part 8E controls the communication with another device (the terminal device 4 in this example) and processing carried out by the challenge generating part 8A, the storing part 8B, the response validating part 8C and the validity period determining part 8D.

Although one terminal device 4 is connected to the NW1 in this embodiment, any number of terminal devices can be connected to the certificate issuing system according to the present invention.

Next, an operation of the certificate issuing system according to the first embodiment of the present invention configured as described above will be described with reference to the drawings.

Figure 3:
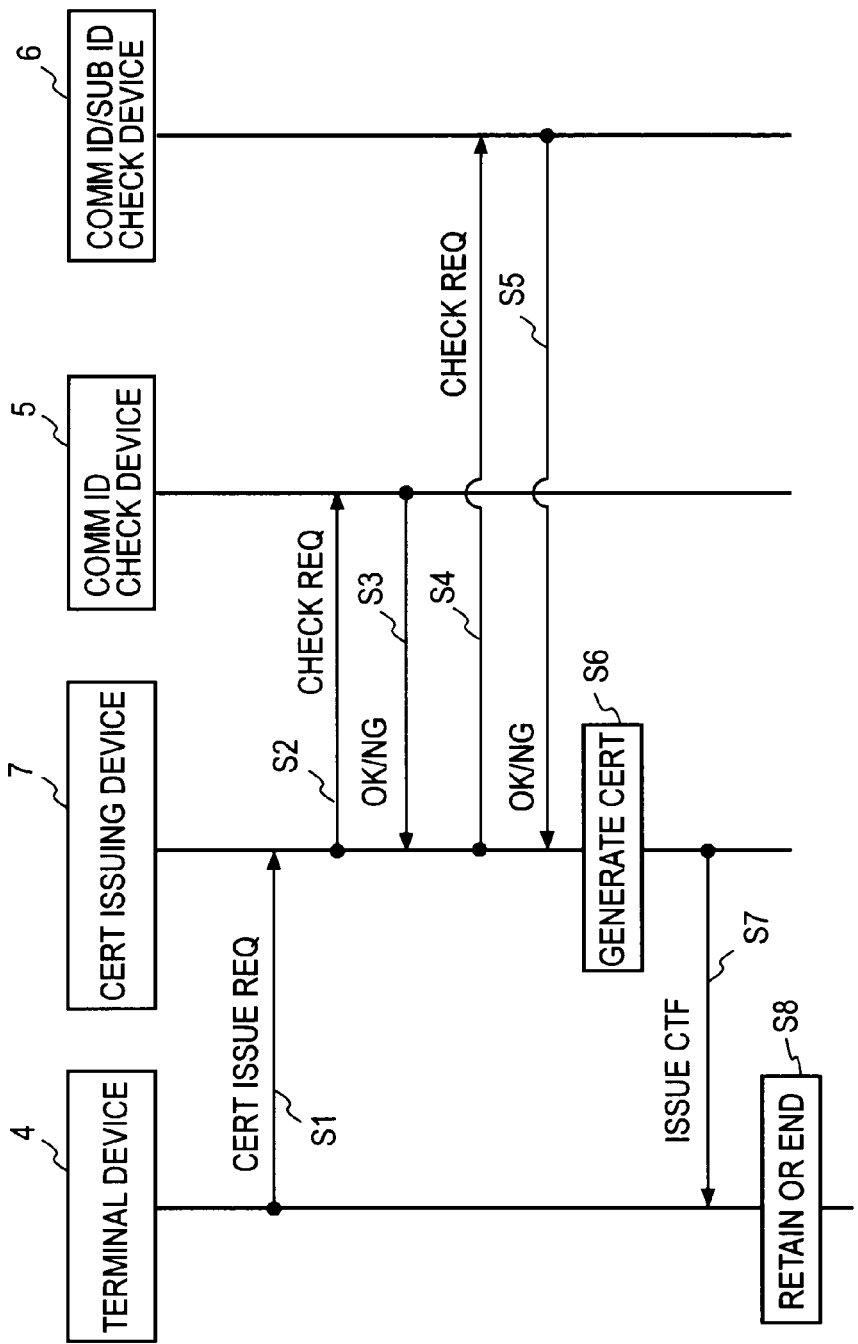
FIG. 3 is a sequence diagram for illustrating a main flow of a certificate issuing process of the certificate issuing system according to the first embodiment of the present invention.

FIG. 3 is a diagram for illustrating a main flow of a certificate issuing process of the certificate issuing system according to the first embodiment of the present invention. In the following, the certificate issuing process will be described in detail.

First, the certificate issue requesting part 43 in the terminal device 4 reads the communication ID from the communication ID storing part 41 and transmits a certificate issue request including at least the sub ID along with the communication ID to the certificate issuing device 7 via the NW1 (step S1).

When the certificate issuing device 7 receives the certificate issue request from the terminal device 4 via the NW1, the certificate issuing device 7 requests the communication ID checking device 5 to check whether or not the communication ID included in the certificate issue request is in use (step S2).

In response to the check request from the certificate issuing device 7, the communication ID checking device 5 checks whether or not the communication ID included in the certificate issue request is in use on the NW1 in cooperation with the NW1 and sends the OK check result back to the certificate issuing device 7 if the communication ID is in use or sends the NG check result back to the certificate issuing device 7 if the communication ID is not in use (step S3). To check the communication ID in cooperation with the NW1, for example, a communication managing device (not shown) on the NW1, such as an exchanger and an ISP, carries out management of the communication ID as one of communication network functions, and the communication ID checking device 5 obtains information on whether or not the communication ID is in use from the communication managing device.

Then, the certificate issuing device 7 receives the check result from the communication ID checking device 5 and requests the communication ID/sub ID checking device 6 to check whether or not the communication ID and the sub ID included in the certificate issue request are associated with each other (step S4).

In response to the check request from the certificate issuing device 7, the communication ID/sub ID checking device 6 checks whether or not the communication ID and the sub ID included in the certificate issue request are associated with each other and sends the OK check result back to the certificate issuing device 7 if the communication ID and the sub ID are associated with each other or sends the NG check result back to the certificate issuing device 7 if the communication ID and the sub ID are not associated with each other (step S5).

The certificate issuing device 7 receives the check result from the communication ID/sub ID checking device 6. If both the check result from the communication ID/sub ID checking device 6 and the check result from the communication ID checking device 5 are OK, the certificate issuing device 7 generates a certificate CTF including at least the ID of the certificate issuing device 7, the communication ID and the sub ID of the terminal device 4 and the validity period and transmits the certificate CTF to the terminal device 4 via the NW1. If either of the check results is NG, the certificate issuing device 7 informs the terminal device 4 that the issue is denied via the NW1 (step S6).

The certificate issue requesting part 43 in the terminal device 4 receives the certificate CTF transmitted from the certificate issuing device 7 via the NW1 (step S7) and retains the received certificate CTF in the certificate storing part 42. Alternatively, in the case where the terminal device 4 is informed that the issue is denied, the process is ended (step S8).

Figure 4:
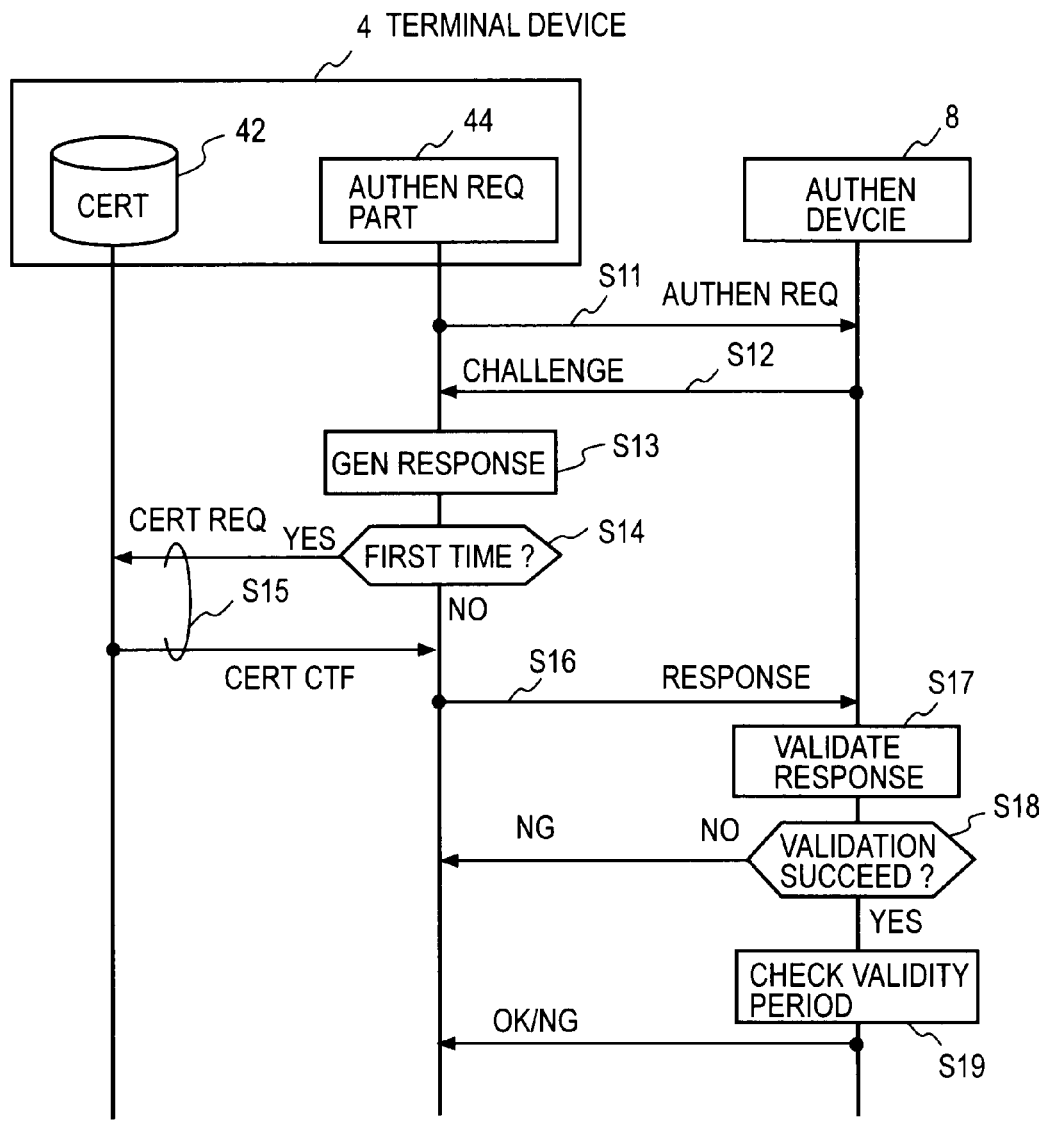
FIG. 4 is a sequence diagram for illustrating a main flow of a certificate authentication process of the certificate issuing system according to the first embodiment of the present invention.

FIG. 4 is a diagram for illustrating a main flow of a certificate authentication process of the certificate issuing system according to the first embodiment of the present invention. In the following, an operation of the certificate issuing system will be described.

First, the authentication requesting part 44 in the terminal device 4 transmits an authentication request including at least the sub ID to the authentication device 8 via the NW2 (step S11).

Then, when the authentication device 8 receives the authentication request from the terminal device 4 via the NW2, the authentication device 8 generates a challenge, stores the challenge in the storing part 8B and transmits the challenge to the terminal device 4 via the NW2 (step S12).

When the authentication requesting part 44 in the terminal device 4 receives the challenge from the authentication device 8 via the NW2, the authentication requesting part 44 generates a response to the challenge using the private key of the terminal device 4 (step S13) and determines whether the authentication request is the first one (step S14). Then, if the authentication request is the first one, the authentication requesting part 44 reads the certificate CTF from the certificate storing part 42 (step S15) and transmits the certificate CTF, the public key of the terminal device 4 and the response to the authentication device 8 via the NW2 (step S16). If the authentication request is the second or subsequent one, the authentication requesting part 44 transmits the response to the challenge along with the public key of the terminal device 4 to the authentication device 8 via the NW2 (step S16). That is, in the case where the authentication request is the second or subsequent one, transmission of the certificate is omitted.

The authentication device 8 receives the response to the challenge and the public key of the terminal device 4 or receives the response to the challenge and the public key of the terminal device 4 and the certificate from the terminal device 4 via the NW2. In the case where the received information includes the certificate CTF, the certificate is stored in the storing part 8B, and the response validating part 8C validates the received response using the public key of the terminal device 4 and the challenge read from the storing part 8B (step S17). Then, it is determined whether or not the validation succeeds. If the validation fails, the authentication device 8 transmits the NG authentication result to the terminal device 4 via the NW2 (step S18). If the validation succeeds, it is determined whether the validity period included in the stored certificate CTF is expired. If the validity period is not expired, the OK authentication result is transmitted to the terminal device 4 via the NW2, or if the validity period is expired, the NG authentication result is transmitted to the terminal device 4 via the NW2 (step S19).

In the case where the information received from the terminal device 4 does not include the certificate, it means that the authentication request is the second or subsequent one from the same terminal device 4. Therefore, in step S19, the certificate CTF at the time of the first authentication stored in the storing part 8B is retrieved based on the sub ID (or the communication ID), and the validity period of the read certificate CTF is checked.

The authentication requesting part 44 in the terminal device receives the authentication result from the authentication device 8 via the NW2.

According to this embodiment, a certificate having a short validity period is issued simply by checking the access of the terminal device 4 to the certificate issuing device 7 via the NW1 and the association between the communication ID and the sub ID, without the need of identification of the user. Thus, the authentication device 8 connected to the NW2, which is different from the NW1 to which the certificate issuing device 7 is connected, can carry out authentication, so that various services can be used even in the case where the original communication ID cannot be used, for example, even in the case where the terminal device 4 is roaming.

Second Embodiment

According to a second embodiment of the present invention, in the first embodiment described above, the certificate issuing device 7 retains the check result(s) in the storing part 7D when the certificate issuing device 7 receives the check result from the communication ID checking device 5 and/or the check result from the communication ID/sub ID checking device 6, searches for the retained check result(s) using the communication ID or both the communication ID and the sub ID in response to the second or subsequent certificate issue request, generates a certificate CTF by referring to the check result that indicates whether or not the communication ID is in use or the check result that indicates whether or not the communication ID and the sub ID are associated with each other if there is the check result, and transmits the certificate CTF to the terminal device 4.

The configuration of the certificate issuing system according to this embodiment is the same as in the first embodiment except the procedure in the certificate issuing device 7 described above.

Figure 5:
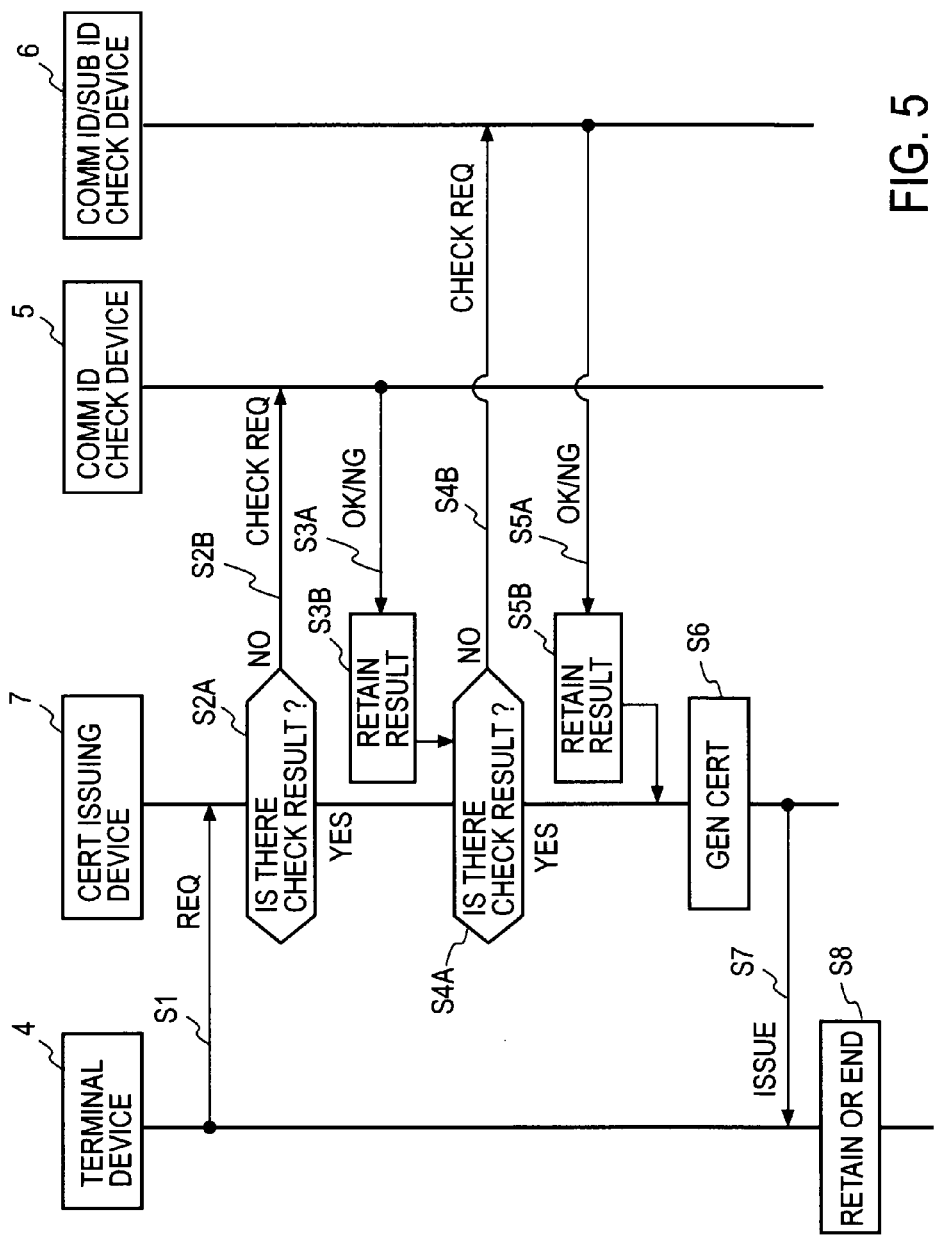
FIG. 5 is a sequence diagram for illustrating a main flow of a certificate issuing process of a certificate issuing system according to a second embodiment of the present invention.

FIG. 5 is a diagram for illustrating a main flow of a certificate issuing process of the certificate issuing system according to the second embodiment of the present invention. In the following, the certificate issuing process will be described in detail.

When the certificate issuing device 7 receives the certificate issue request from the terminal device 4 via the NW1 (step S1), the certificate issuing device 7 searches for the retained check result using the communication ID or both the communication ID and the sub ID included in the certificate issue request to determine whether the check result is retained (step S2A). If the check result is retained, the certificate issuing device 7 reads the check result, and the process proceeds to step S4A. If the check result is not retained, the certificate issuing device 7 transmits a check request to the communication ID checking device 5 (step S2B). When the certificate issuing device 7 receives the check result that indicates whether or not the communication ID is in use from the communication ID checking device 5 (step S3A), the certificate issuing device 7 retains the check result in the storing part 7D (step S3B).

Then, the certificate issuing device 7 searches for the check result that indicates whether or not the communication ID and the sub ID are associated with each other (Step S4A). If the check result is retained, the certificate issuing device 7 reads the check result, and the process proceeds to step S6. If the check result that indicates the association is not retained, the certificate issuing device transmits a check request to the communication ID/sub ID checking device 6 to check whether or not the communication ID and the sub ID are associated with each other (step S4B), receives the check result (step S5A), and retains the check result in the storing part 7D (step S5B). If the communication ID is in use, and the communication ID and the sub ID are properly associated with each other, the certificate issuing device 7 generates a certificate CTF and transmits the certificate CTF to the terminal device 4 (steps S6 and S7).

The certificate authentication process is the same as in the first embodiment.

According to this embodiment, the query to the communication ID checking device 5 and/or the communication ID/sub ID checking device 6 in response to the second or subsequent certificate issue request from the same terminal device 4 is not necessary, and therefore, the certificate can be issued more quickly.

Third Embodiment

In the system shown in FIG. 1, for example, if the communication ID checking device 5 and the communication ID/sub ID checking device 6 are connected to each other in the same HGW as the terminal device 4, the certificate issuing device 7 on the NW1 outside the HGW cannot directly accesses the communication ID checking device 5 and the communication ID/sub ID checking device 6. To cope with such a situation, according to a third embodiment of the present invention, in the first embodiment described earlier, the certificate issuing device 7 requests, via the terminal device 4, the communication ID checking device 5 and/or the communication ID/sub ID checking device 6 to check whether or not the communication ID included in the certificate issue request is in use and/or whether or not the communication ID and the sub ID included in the certificate issue request are associated with each other.

The configuration of the certificate issuing system according to this embodiment is the same as in the first embodiment except the procedure in the certificate issuing device 7 described above.

Figure 6:
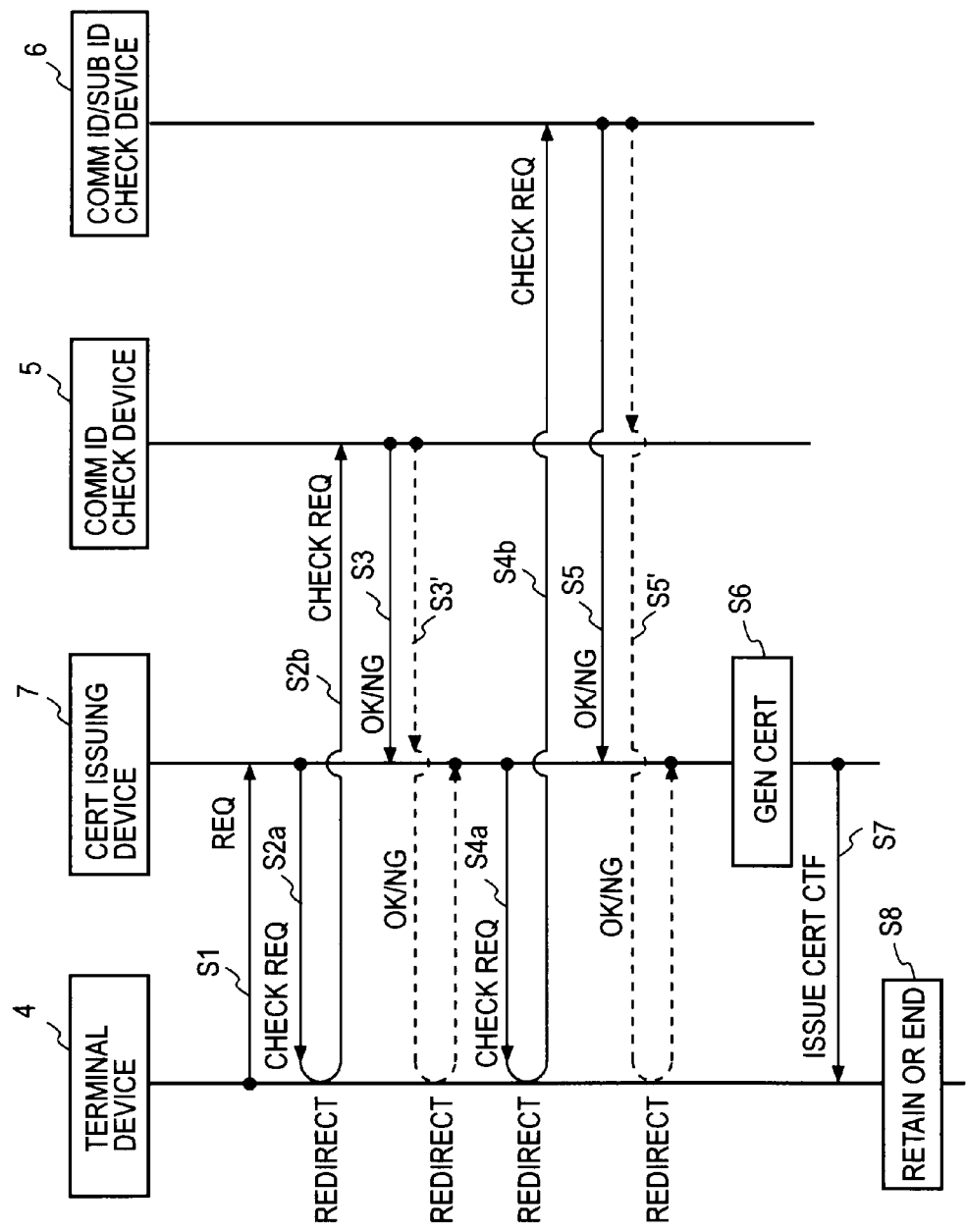
FIG. 6 is a sequence diagram for illustrating a main flow of a certificate issuing process of a certificate issuing system according to a third embodiment of the present invention.

FIG. 6 is a diagram for illustrating a main flow of a certificate issuing process of the certificate issuing system according to the third embodiment of the present invention. In the following, the certificate issuing process will be described in detail.

When the certificate issuing device 7 receives the certificate issue request from the terminal device 4 via the NW1 (step S1), the certificate issuing device 7 transmits a check request to the terminal device 4 via the NW1 to check whether or not the communication ID included in the certificate issue request is in use (step S2a).

When the terminal device 4 receives the check request to check whether or not the communication ID included in the certificate issue request is in use, which is transmitted from the certificate issuing device 7 via the NW1, the terminal device 4 redirects the check request to the communication ID checking device 5 (step S2b).

In response to the request from the certificate issuing device 7 redirected by the terminal device 4, the communication ID checking device 5 checks whether or not the communication ID included in the certificate issue request is in use on the NW1 in corporation with the NW1 and transmits the OK check result to the certificate issuing device 7 if the communication ID is in use or the NG check result to the certificate issuing device 7 if the communication ID is not in use (step S3).

The certificate issuing device 7 receives the check result from the communication ID checking device 5 and transmits a check request to the terminal device 4 via the NW1 to check whether or not the communication ID and the sub ID included in the certificate issue request are associated with each other (step S4a).

When the terminal device 4 receives the check request to check whether or not the communication ID and the sub ID included in the certificate issue request are associated with each other, which is transmitted from the certificate issuing device 7 via the NW1, the terminal device 4 redirects the check request to the communication ID/sub ID checking device 6 (step S4b).

In response to the request from the certificate issuing device 7 redirected by the terminal device 4, the communication ID/sub ID checking device 6 checks whether or not the communication ID and the sub ID included in the certificate issue request are associated with each other and transmits the OK check result to the certificate issuing device 7 if the communication ID and the sub ID are associated with each other or the NG check result to the certificate issuing device 7 if the communication ID and the sub ID are not associated with each other (step S5).

The certificate issuing device 7 generates a certificate CTF based on the check result from the communication ID checking device 5 that indicates that the communication ID is in use and the check result from the communication ID/sub ID checking device 6 that indicates that the communication ID and the sub ID are properly associated with each other (step S6) and transmits the certificate CTF to the terminal device 4 (step S7).

In the above description, in steps S3 and S5, the communication ID checking device 5 and the communication ID/sub ID checking device 6 directly respond to the certificate issuing device 7. Alternatively, however, in steps S3' and S5' shown by the dashed line, the communication ID checking device 5 and the communication ID/sub ID checking device 6 can respond to the certificate issuing device 7 via the terminal device 4 that redirects the response. The certificate authentication process is the same as in the first embodiment.

According to this embodiment, the certificate issuing device 7 can transmits the check request to the communication ID checking device 5 and/or the communication ID/sub ID checking device 6 via the terminal device 4 even when the communication ID checking device 5 and/or the communication ID/sub ID checking device 6 reside in the same HGW as the terminal device 4. Of course, this embodiment can be applied to the second embodiment.

Fourth Embodiment

According to a fourth embodiment, in the first embodiment described earlier, the NW1 adds the communication ID of the terminal device 4 to the certificate issue request from the terminal device 4.

Figure 7:
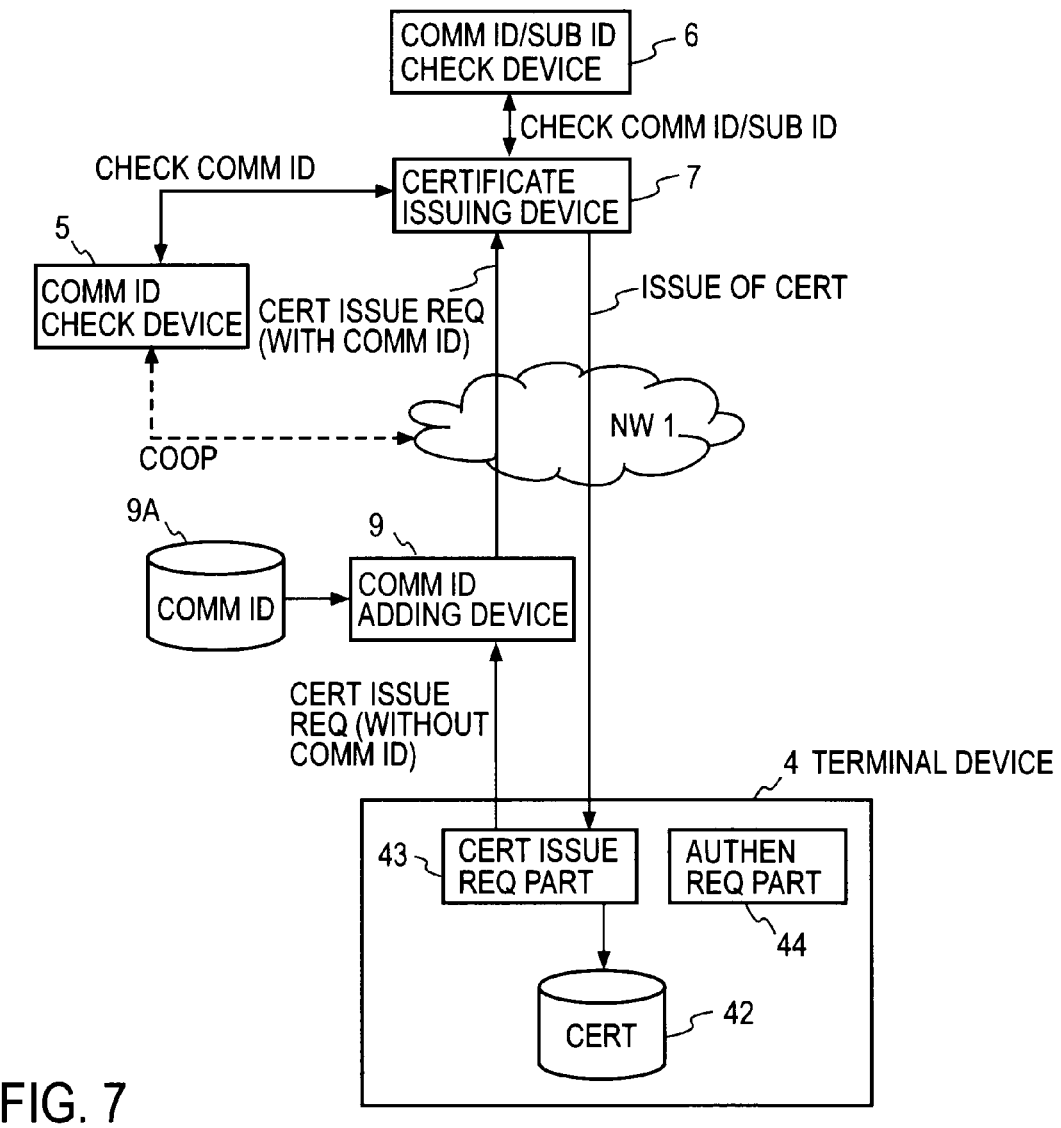
FIG. 7 is a block diagram showing a configuration of a certificate issuing system according to a fourth embodiment of the present invention.

FIG. 7 shows a configuration of a certificate issuing system according to the fourth embodiment of the present invention. The certificate issuing system differs from the system according to the first embodiment in that the system further includes a communication ID adding device 9 that adds the communication ID of the terminal device 4 to the certificate issue request from the terminal device 4. The communication ID adding device 9 is typically provided in a PBX or HGW in which the terminal device 4 resides (not shown).

The terminal device 4 does not have the communication ID storing part 41 shown in FIG. 1, and a communication ID storing device 9A is connected to the communication ID adding device 9. The certificate issue requesting part 43 transmits a certificate issue request that does not include the communication ID but include at least the sub ID to the certificate issuing device 7 via the communication ID adding device 9. At this time, the communication ID adding device 9 adds the communication ID read from the communication ID storing device 9A to the certificate issue request and transmits the certificate issue request to the certificate issuing device 7. The certificate issue requesting part 43 in the terminal device 4 receives the certificate CTF transmitted from the certificate issuing device 7 via the NW1 and retains the certificate CTF in the certificate storing part 42.

The configuration of the certificate issuing system according to this embodiment is the same as in the first embodiment except the points described above.

Figure 8:
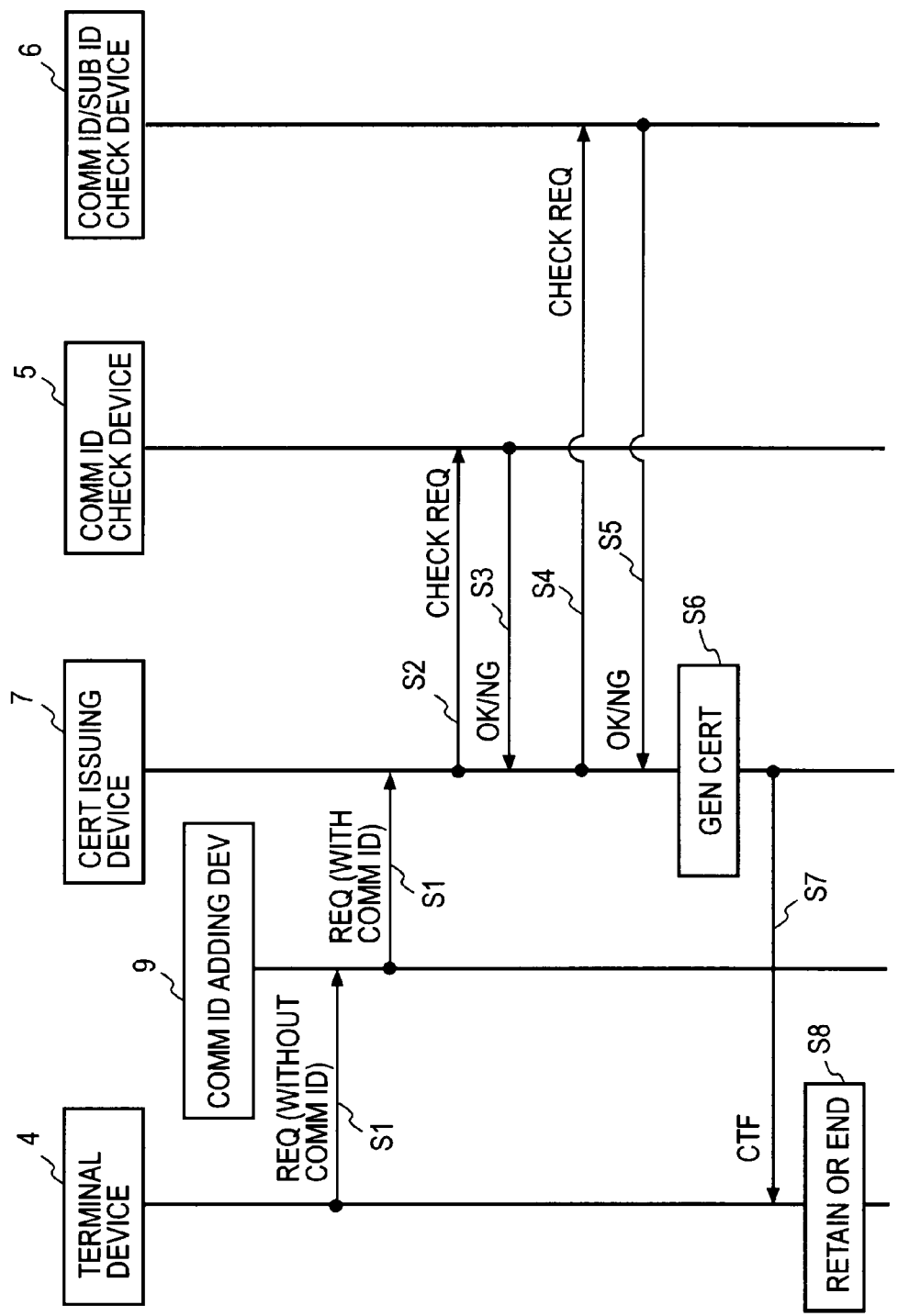
FIG. 8 is a sequence diagram for illustrating a main flow of a certificate issuing process of the certificate issuing system according to the fourth embodiment of the present invention.

FIG. 8 is a diagram for illustrating a main flow of a certificate issuing process of the certificate issuing system according to the fourth embodiment of the present invention. In the following, the certificate issuing process will be described in detail.

First, the certificate issue requesting part 43 in the terminal device 4 transmits a certificate issue request including at least the sub ID to the certificate issuing device 7 via the NW1. In this process, the communication ID adding device 9 receives the certificate issue request, adds the communication ID of the terminal device 4 read from the communication ID storing device 9A, transmits the certificate issue request to the certificate issuing device 7. The following operation and the certificate authentication process are the same as those in the first embodiment, and descriptions thereof will be omitted.

According to this embodiment, the communication ID storing part 41 that stores the communication ID in the terminal device 4 is not necessary. Of course, this embodiment can be applied to the second and third embodiments.

Fifth Embodiment

According to a fifth embodiment of the present invention, in the first embodiment described earlier, the certificate is transmitted to the terminal device via a third communication network that differs from the NW1.

Figure 9:
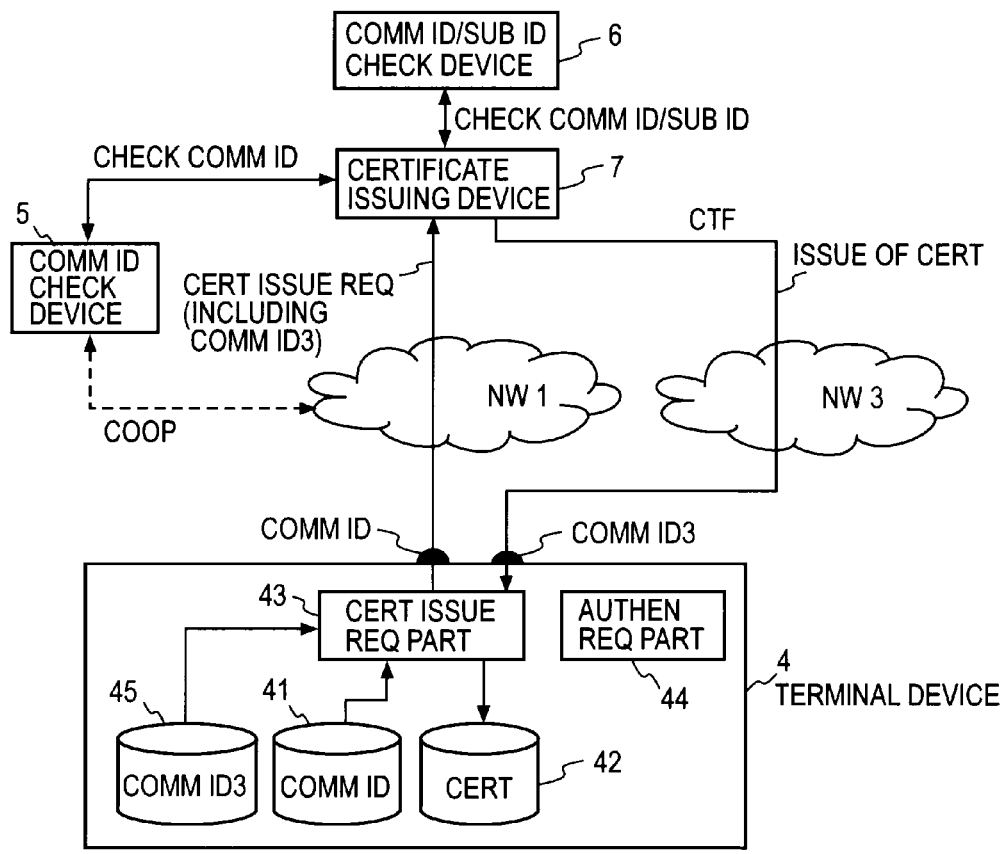
FIG. 9 is a block diagram showing a configuration of a certificate issuing system according to a fifth embodiment of the present invention.

FIG. 9 shows a configuration of a certificate issuing system according to the fifth embodiment of the present invention. The certificate issuing system differs from the system according to the first embodiment in that the system further includes a third communication network NW3, for example, an electronic mail network. The terminal device 4 has a second communication ID storing part (communication ID3 storing part) 45 that stores a communication ID on the NW3 (a communication ID3) (an e-mail address, for example) of the terminal device 4 in addition to the communication ID storing part 41, the certificate storing part 42 and the authentication requesting part 44. The terminal device 4 reads the communication ID from the communication ID storing part 41 and the communication ID3 from the communication ID3 storing part 45 and transmits a certificate issue request including at least the sub ID as well as the communication ID and the communication ID3 to the certificate issuing device 7 via the NW1. The terminal device 4 has the certificate issue requesting part 43 that receives the certificate CTF from the certificate issuing device 7 via the NW3 and retains the certificate CTF in the certificate storing part 42.

When the certificate issuing device 7 receives the certificate issue request including at least the communication ID, the communication ID3 and the sub ID from the terminal device 4 via the NW1, the certificate issuing device 7 requests the communication ID checking device 5 to check whether or not the communication ID included in the certificate issue request is in use. Furthermore, the certificate issuing device 7 requests the communication ID/sub ID checking device 6 to check whether or not the communication ID and the sub ID included in the certificate issue request are associated with each other. If the check results from the communication ID checking device 5 and the communication ID/sub ID checking device 6 are OK, the certificate issuing device 7 generates a certificate including at least the ID of the certificate issuing device 7, the sub ID of the terminal device 4 and the validity period and transmits the certificate to the terminal device 4 via the NW3.

The configuration of the certificate issuing system according to this embodiment is the same as in the first embodiment except the points described above.

Figure 10:
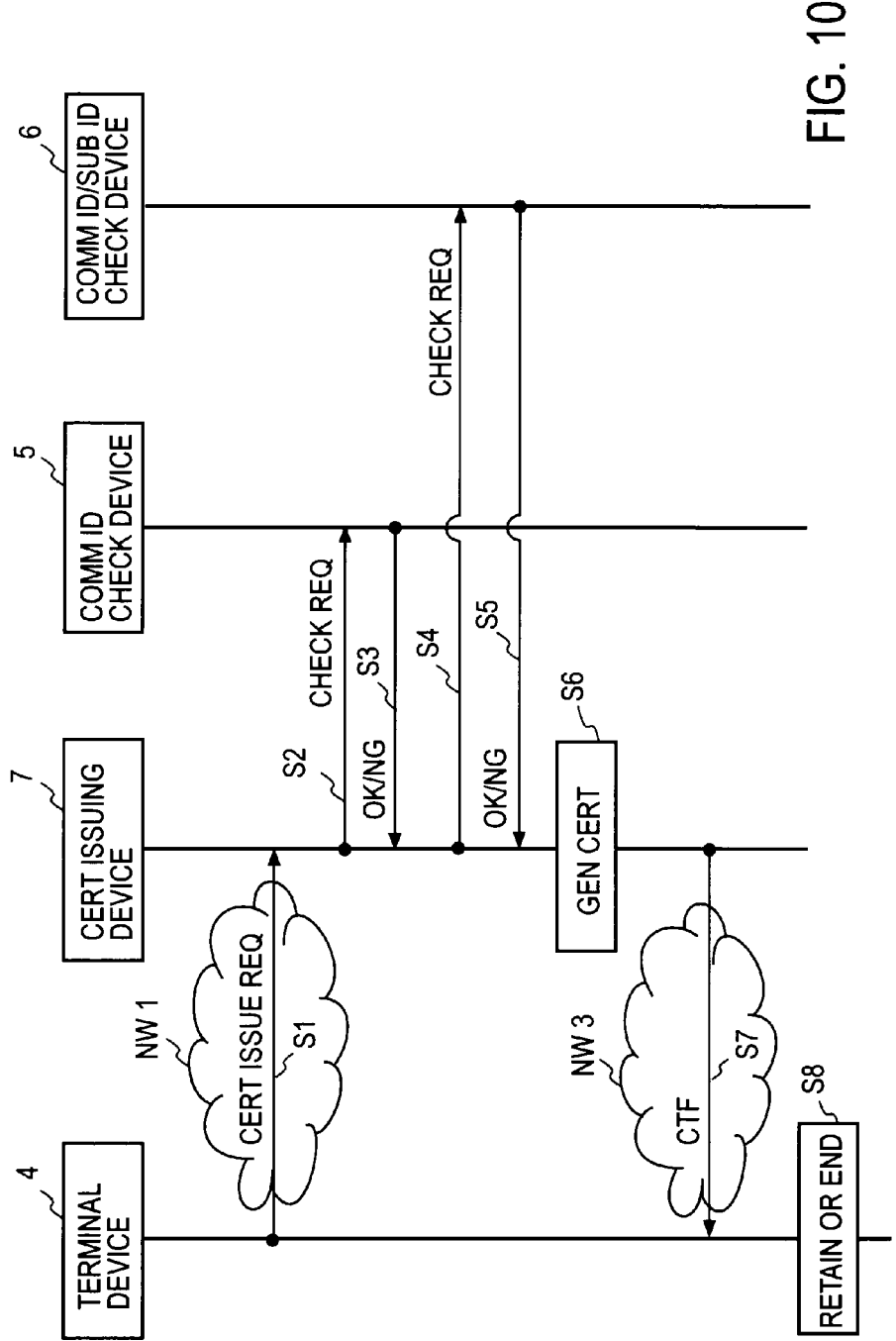
FIG. 10 is a sequence diagram for illustrating a main flow of a certificate issuing process of the certificate issuing system according to the fifth embodiment of the present invention.

FIG. 10 is a diagram for illustrating a main flow of a certificate issuing process of the certificate issuing system according to the fifth embodiment of the present invention. In the following, the certificate issuing process will be described in detail.

First, the certificate issue requesting part 43 in the terminal device 4 reads the communication ID from the communication ID storing part 41, reads the communication ID3 from the communication ID3 storing part 45 and transmits a certificate issue request including at least the communication ID, the communication ID3 and the sub ID to the certificate issuing device 7 via the NW1 (step S1).

When the certificate issuing device 7 receives the certificate issue request from the terminal device 4 via the NW1 (step S1), the certificate issuing device 7 checks whether or not the communication ID included in the certificate issue request is in use and whether or not the communication ID and the sub ID are associated with each other in the same manner as in the first embodiment (steps S2 to S5). If both the check results are OK, the certificate issuing device 7 generates a certificate CTF including at least the ID of the certificate issuing device 7, the communication ID and the sub ID of the terminal device 4 and the validity period (step S6) and transmits the certificate CTF to the terminal device 4 via the NW3 by designating the communication ID3 as the destination (step S7). If either of the check results is NG, the certificate issuing device 7 informs the terminal device 4 that the issue is denied via the NW3.

The certificate issue requesting part 43 in the terminal device 4 receives the certificate CTF from the certificate issuing device 7 via the NW3 and retains the received certificate in the certificate storing part 42. If the terminal device 4 is informed that the issue is denied, the process is ended (step S8).

The certificate authentication process is the same as in the first embodiment.

According to this embodiment, the terminal device 4 can be identified by three IDs, the communication ID, the communication ID3 and the sub ID, so that a certificate with higher reliability can be issued. Of course, this embodiment can be applied to the second to fourth embodiments.

Sixth Embodiment

According to a sixth embodiment, in the first embodiment described earlier, the communication ID checking device 5 and/or the communication ID/sub ID checking device 6 are used in the certificate authentication.

Figure 11:
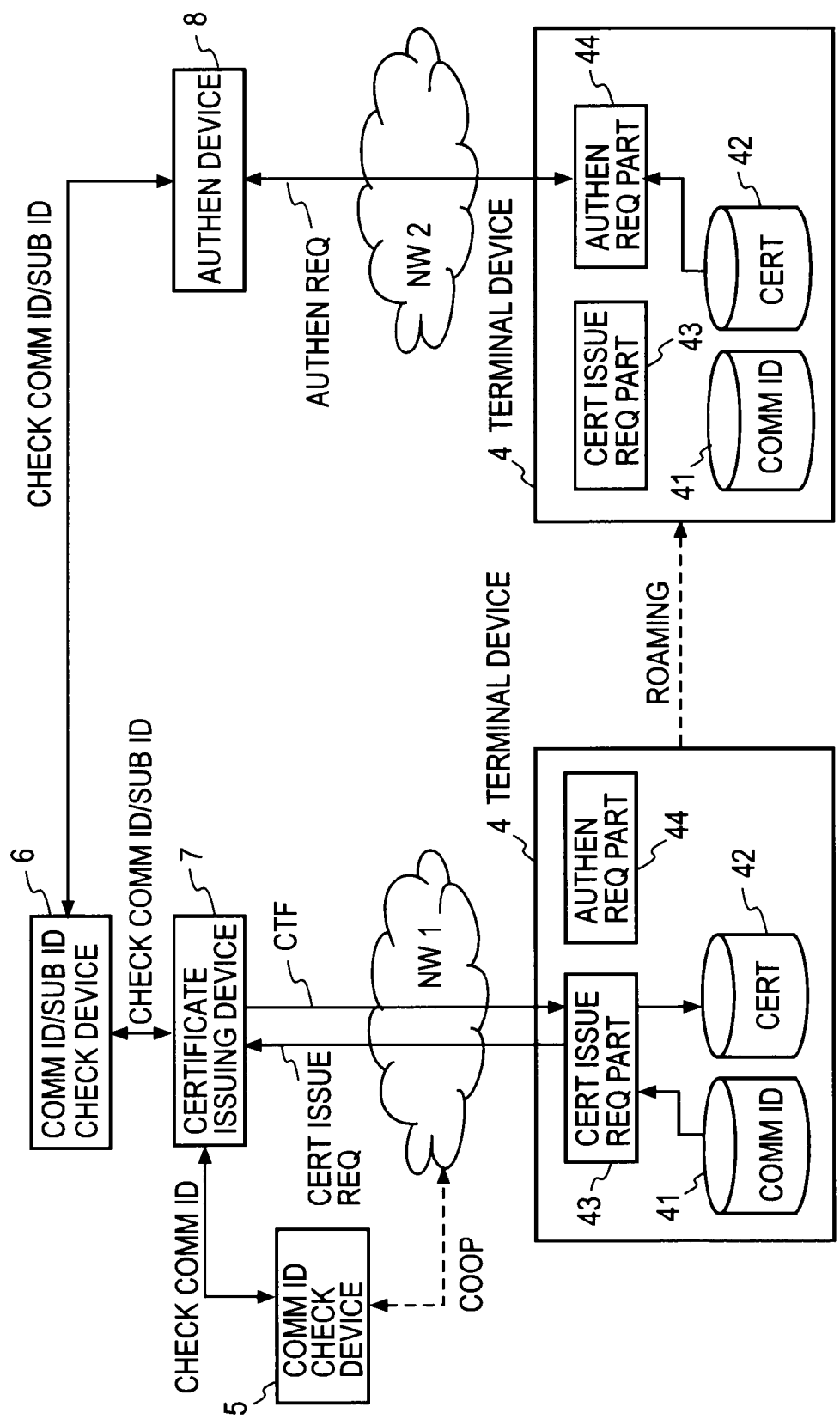
FIG. 11 is a block diagram showing a configuration of a certificate issuing system according to a sixth embodiment of the present invention.

FIG. 11 shows a configuration of a certificate issuing system according to the sixth embodiment of the present invention. The certificate issuing system differs from the system according to the first embodiment in that the authentication device 8 is connected to the communication ID checking device 5 and/or the communication ID/sub ID checking device 6 by a dedicated line, for example. FIG. 11 shows an example in which the authentication device 8 is connected to the communication ID/sub ID checking device 6. When the authentication device 8 receives the authentication request including at least the sub ID from the terminal device 4 via the NW2, the authentication device 8 generates a challenge, stores the challenge and transmits the challenge to the terminal device 4 via the NW2.

The authentication device 8 receives the response to the challenge, the public key of the terminal device and the certificate from the terminal device 4 via the NW2 and stores them. The authentication device 8 validates the received response using the public key of the terminal device 4 and the stored challenge. If the validation fails, the authentication device 8 transmits the NG authentication result to the terminal device 4 via the NW2. If the validation succeeds, and the validity period included in the stored certificate is not expired, the authentication device 8 requests the communication ID checking device 5 and/or the communication ID/sub ID checking device 6 to check the communication ID and/or the relationship between the communication ID and the sub ID. In the example shown in FIG. 11, the communication ID/sub ID checking device 6 is requested to check whether or not the communication ID and the sub ID are associated with each other. If the check result is OK, the authentication device 8 transmits the OK authentication result to the terminal device 4 via the NW2.

The configuration of the certificate issuing system according to this embodiment is the same as in the first embodiment except the points described above. The certificate issuing process is the same as in the first embodiment.

Figure 12:
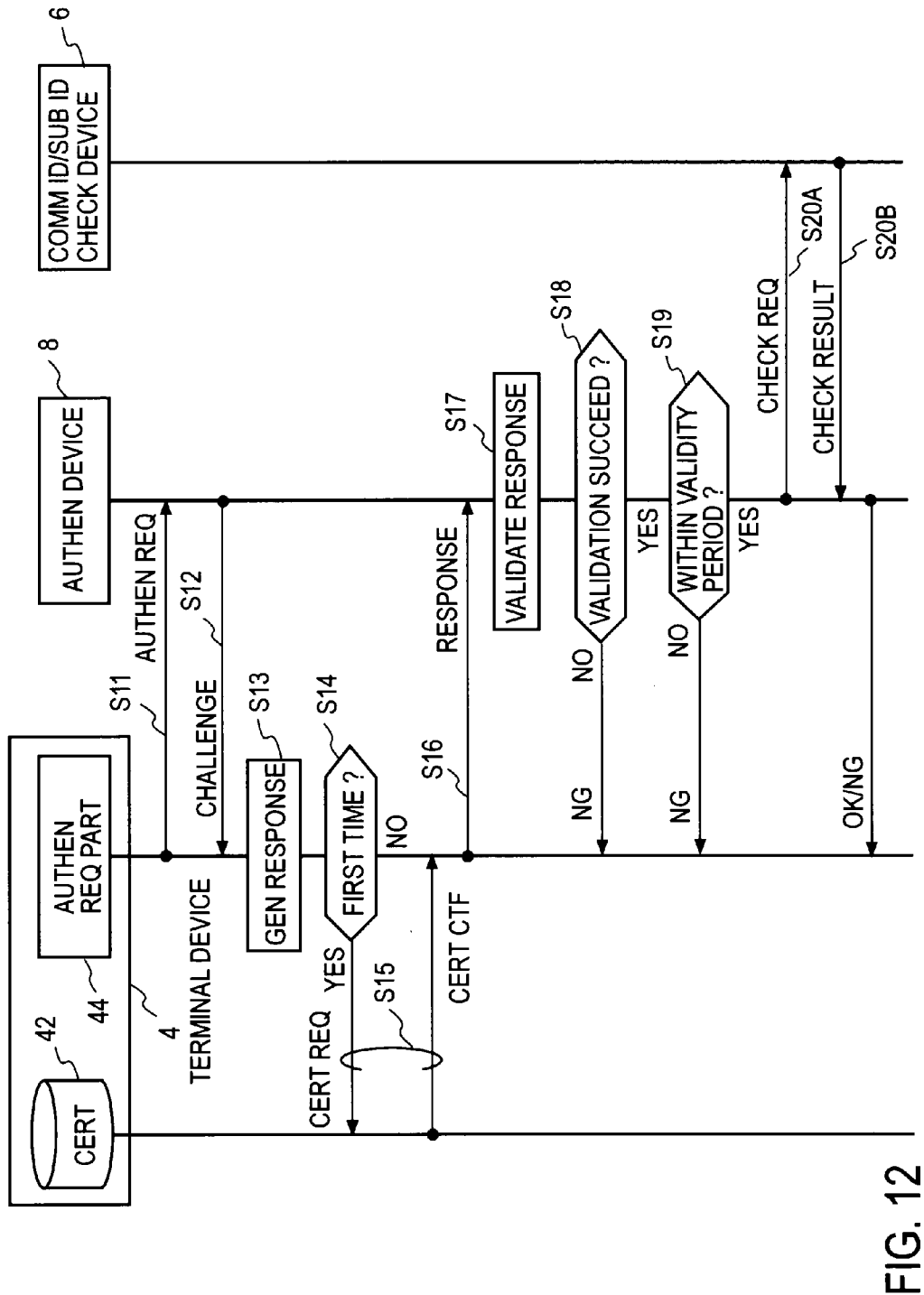
FIG. 12 is a sequence diagram for illustrating a main flow of a certificate authentication process of the certificate issuing system according to the sixth embodiment of the present invention.

FIG. 12 is a diagram for illustrating a main flow of a certificate authentication process of the certificate issuing system according to the sixth embodiment of the present invention shown in FIG. 11. In the following, the certificate authentication process will be described in detail.

From where the terminal device 4 transmits the authentication request to the authentication device 8, up to where the authentication device 8 validates the response, the process is the same as in the first embodiment.

If it is determined in step S18 that the validation succeeds, and it is determined in step S19 that the validity period is not expired, the authentication device 8 further requests the communication ID/sub ID checking device 6 to check whether or not the communication ID and the sub ID included in the certificate CTF are associated with each other in step S20A.

In step S20B, in response to the request from the authentication device 8, the communication ID/sub ID checking device 6 checks whether or not the communication ID and the sub ID included in the certificate CTF are associated with each other and sends the OK check result back to the authentication device 8 if the communication ID and the sub ID are associated with each other or the NG check result back to the authentication device 8 if the communication ID and the sub ID are not associated with each other.

The authentication device 8 receives the check result from the communication ID/sub ID checking device 6. If the check result is OK, the authentication device 8 transmits the OK authentication result to the terminal device 4 via the NW2. If the check result is NG, the authentication device 8 transmits the NG authentication result to the terminal device 4 via the NW2. The authentication requesting part 44 in the terminal device 4 receives the authentication result from the authentication device 8 via the NW2.

According to this embodiment, the association between the communication ID and the sub ID, that is, the validity of the certificate CTF, at the time point when the terminal device 4 requests for authentication can be checked. Of course, this embodiment can be applied to the second to fifth embodiments.

Seventh Embodiment

According to a seventh embodiment of the present invention, in the first embodiment described earlier, the terminal device 4 additionally has a function of registering expiration information on a certificate CTF, and the authentication device 8 additionally has a function of checking whether or not certificate expiration information is registered during authentication of a certificate CTF.

Figure 13:
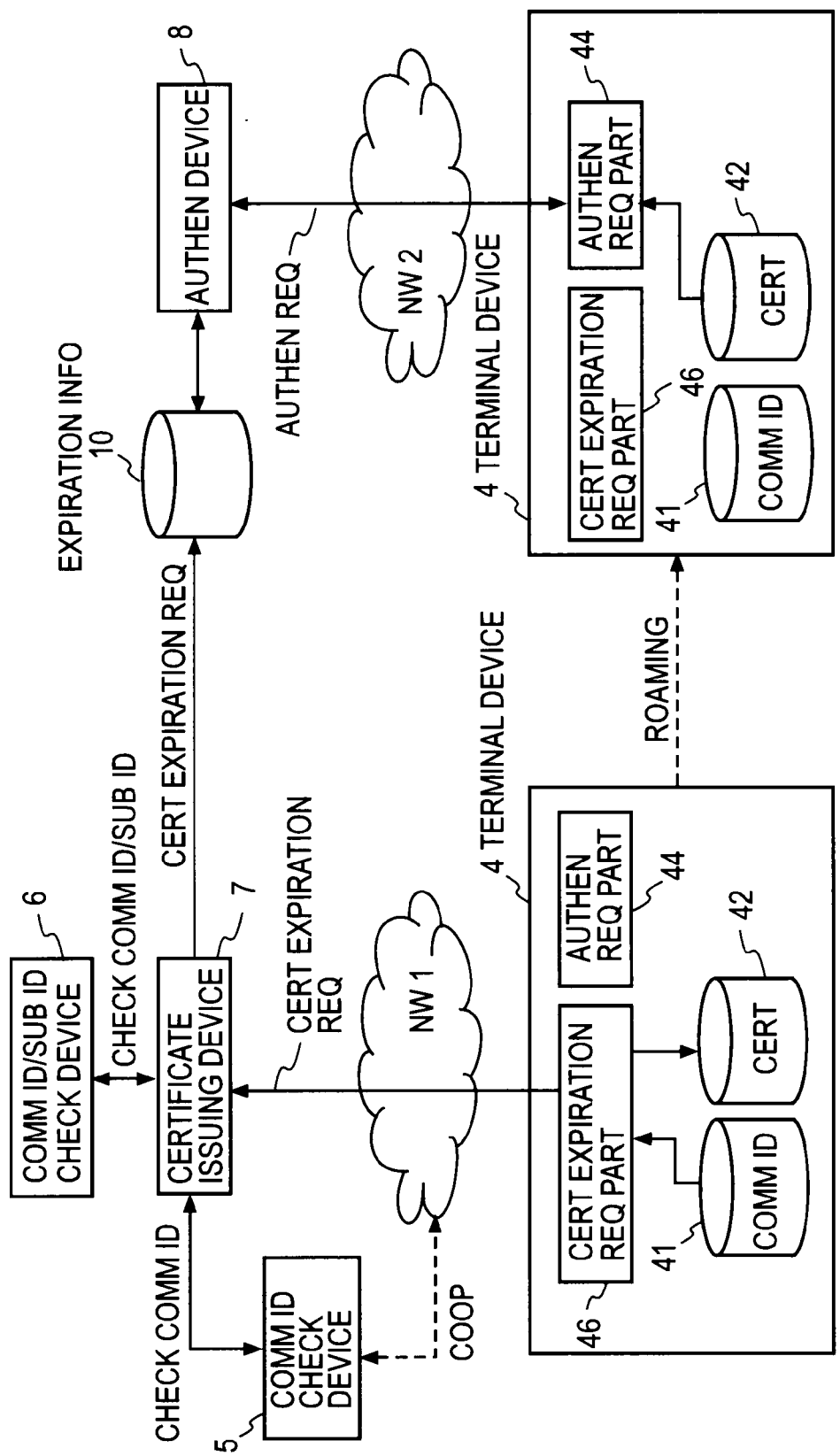
FIG. 13 is a block diagram showing a configuration of a certificate issuing system according to a seventh embodiment of the present invention.

FIG. 13 shows a configuration of a certificate issuing system according to the seventh embodiment of the present invention. The certificate issuing system differs from the system according to the first embodiment in that the system further includes an expiration information storing device 10 in which expiration information on a certificate CTF is registered. The certificate issuing device 7 and the authentication device 8 are connected to the expiration information storing device 10.

The terminal device 4 has a certificate expiration requesting part 46 that reads the communication ID from the communication ID storing part 41 and transmits a certificate expiration request including at least the communication ID and the sub ID to the certificate issuing device 7 via the NW1 in addition to the communication ID storing part 41, the certificate storing part 42, the certificate issue requesting part 43 (not shown) and the authentication requesting part 44.

The certificate issuing device 7 additionally has a certificate expiration information generating part 7F as shown by the dashed line in FIG. 2A. In addition to the functions in the first embodiment, when the certificate expiration request including at least the communication ID and the sub ID is received from the terminal device 4 via the NW1, the communication ID check requesting part 7A requests the communication ID checking device 5 to check whether or not the communication ID included in the certificate expiration request is in use, and the communication ID/sub ID check requesting part 7B requests the communication ID/sub ID checking device 6 to check whether or not the communication ID and the sub ID included in the certificate expiration request are associated with each other. If the check results from the communication ID checking device 5 and the communication ID/sub ID checking device 6 are OK, the certificate expiration information generating part 7F generates expiration information on the certificate including the communication ID and the sub ID and registers the expiration information in the expiration information storing device 10.

Figure 2C:
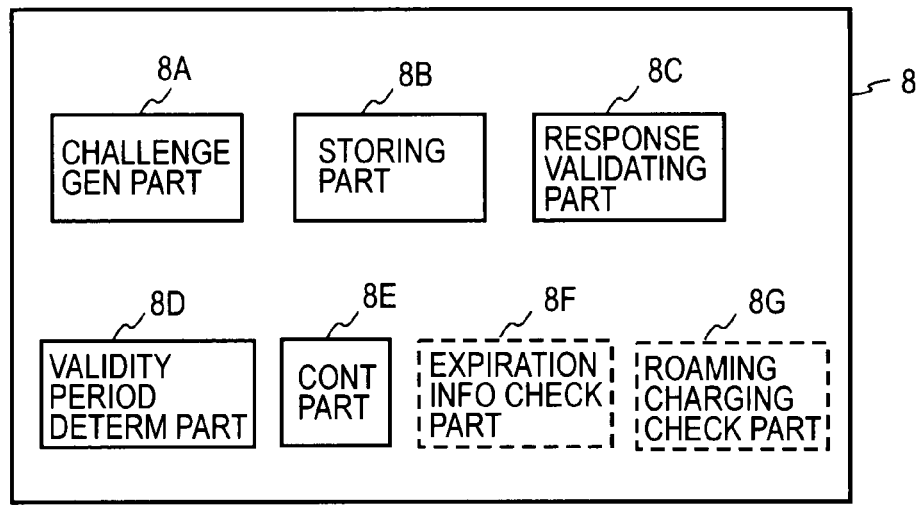
FIG. 2C is a block diagram showing a functional configuration of an authentication device.

The authentication device 8 additionally has an expiration information checking part 8F as shown by the dashed line in FIG. 2C. When the authentication request including at least the sub ID is received from the terminal device 4 via the NW2, the challenge generating part 8A generates a challenge, stores the challenge in the storing part 8B and transmits the challenge to the terminal device 4 via the NW2. The authentication device 8 receives the response to the challenge, the public key of the terminal device and the certificate CTF from the terminal device 4 via the NW2 and stores them. The response validating part 8C validates the received response using the public key of the terminal device 4 and the stored challenge. If the validation fails, the authentication device 8 transmits the NG authentication result to the terminal device 4 via the NW2. If the validation succeeds, and the validity period included in the stored certificate is not expired, the expiration information checking part 8F checks whether or not there is expiration information on a certificate including at least the communication ID and the sub ID included in the certificate CTF in the expiration information storing device 10. If there is not the expiration information, the authentication device 8 transmits the OK authentication result to the terminal device 4 via the NW2, or if there is the expiration information listed therein, the authentication device 8 transmits the NG authentication result to the terminal device 4 via the NW2.

The configuration of the certificate issuing system according to this embodiment is the same as in the first embodiment except the points described above.

Figure 14:
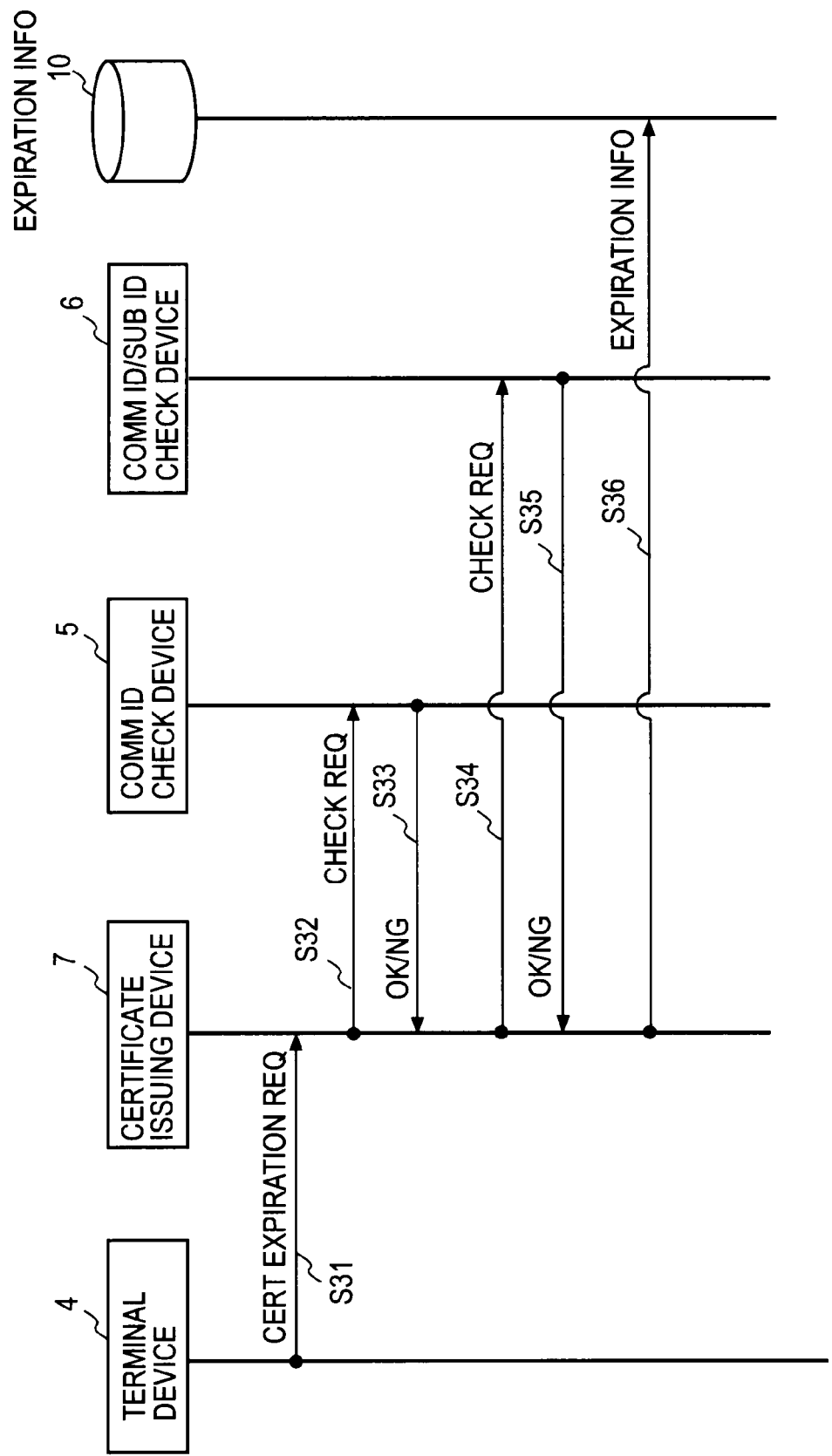
FIG. 14 is a sequence diagram for illustrating a main flow of a certificate expiration process of the certificate issuing system according to the seventh embodiment of the present invention.

FIG. 14 is a diagram for illustrating a main flow of a certificate expiration process of the certificate issuing system according to the seventh embodiment of the present invention. In the following, the certificate expiration process will be described in detail.

First, the certificate expiration requesting part 46 in the terminal device 4 reads the communication ID from the communication ID storing part 41 and transmits the sub ID certificate expiration request including at least the communication ID and the sub ID to the certificate issuing device 7 via the NW1 (step S31).

When the certificate issuing device 7 receives the certificate expiration request from the terminal device 4 via the NW1, the certificate issuing device 7 requests the communication ID checking device 5 to check whether or not the communication ID included in the certificate expiration request is in use (step S32).

In response to the request from the certificate issuing device 7, the communication ID checking device 5 checks whether or not the communication ID included in the certificate expiration request is in use in corporation with the NW1 and sends the OK check result back to the certificate issuing device 7 if the communication ID is in use or the NG check result back to the certificate issuing device 7 if the communication ID is not in use (step S33).

The certificate issuing device 7 receives the check result from the communication ID checking device 5 and requests the communication ID/sub ID checking device 6 to check whether or not the communication ID and the sub ID included in the certificate expiration request are associated with each other (step S34).

In response to the request from the certificate issuing device 7, the communication ID/sub ID checking device 6 checks whether or not the communication ID and the sub ID included in the certificate expiration request are associated with each other and sends the OK check result back to the certificate issuing device 7 if the communication ID and the sub ID are associated with each other or the NG check result back to the certificate issuing device 7 if the communication ID and the sub ID are not associated with each other (step S35).

The certificate issuing device 7 receives the check result from the communication ID/sub ID checking device 6. If both the check results from the communication ID/sub ID checking device 6 and the communication ID checking device 5 are OK, the certificate issuing device 7 generates expiration information on the certificate including at least the communication ID and the sub ID of the terminal device 4 and registers the expiration information in the expiration information storing device 10. If either of the check results is NG, the process is ended (step S36).

Figure 15:
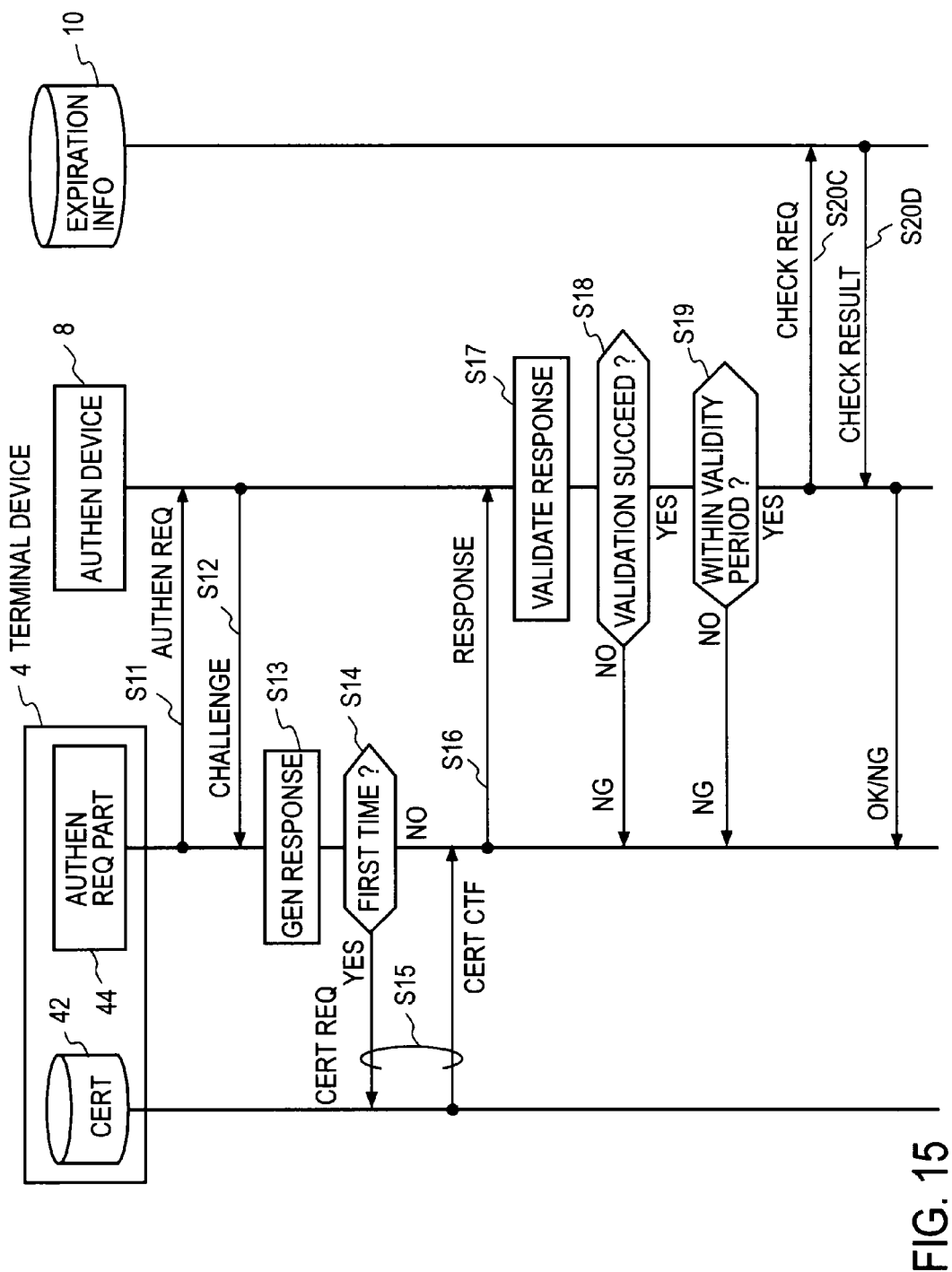
FIG. 15 is a sequence diagram for illustrating a main flow of a certificate authentication process of the certificate issuing system according to the seventh embodiment of the present invention.

FIG. 15 is a diagram for illustrating a main flow of a certificate authentication process of the certificate issuing system according to the seventh embodiment of the present invention. In the following, the certificate authentication process will be described in detail.

From where the terminal device 4 transmits the authentication request to the authentication device 8, up to where the authentication device 8 validates the response, the process is the same as shown in FIG. 12.

If the validation succeeds (steps S17 and S18), the validity period is not expired (step S19), the authentication device 8 further requests the expiration information storing device 10 to check whether or not there is expiration information on a certificate including at least the communication ID and the sub ID included in the certificate (step S20C).

In response to the request from the authentication device 8, the expiration information storing device 10 checks whether or not there is expiration information on a certificate including at least the communication ID and the sub ID and sends the check result that indicates that there is the relevant information back to the authentication device 8 if there is the expiration information or the check result that indicates that there is not the relevant information back to the authentication device 8 if there is not the expiration information (step S20D).

The authentication device 8 receives the check result from the expiration information storing device 10. If there is not the relevant information, the authentication device 8 transmits the OK authentication result to the terminal device 4 via the NW2. If there is the relevant information, the authentication device 8 transmits the NG authentication result to the terminal device 4 via the NW2. The authentication requesting part 44 in the terminal device 4 receives the authentication result from the authentication device 8 via the NW2.

According to this embodiment, the terminal device 4 or in other words the user can request expiration of a certificate, and the authentication device 8 can check the validity of a certificate CTF in response to the request for authentication of the certificate by using the expiration information storing device 10 in which the expiration information is registered. Of course, this embodiment can be applied to the second to sixth embodiments.

Eighth Embodiment

According to an eighth embodiment of the present invention, in the first embodiment described earlier, an optimal one of a plurality of certificates can be used.

Figure 16:
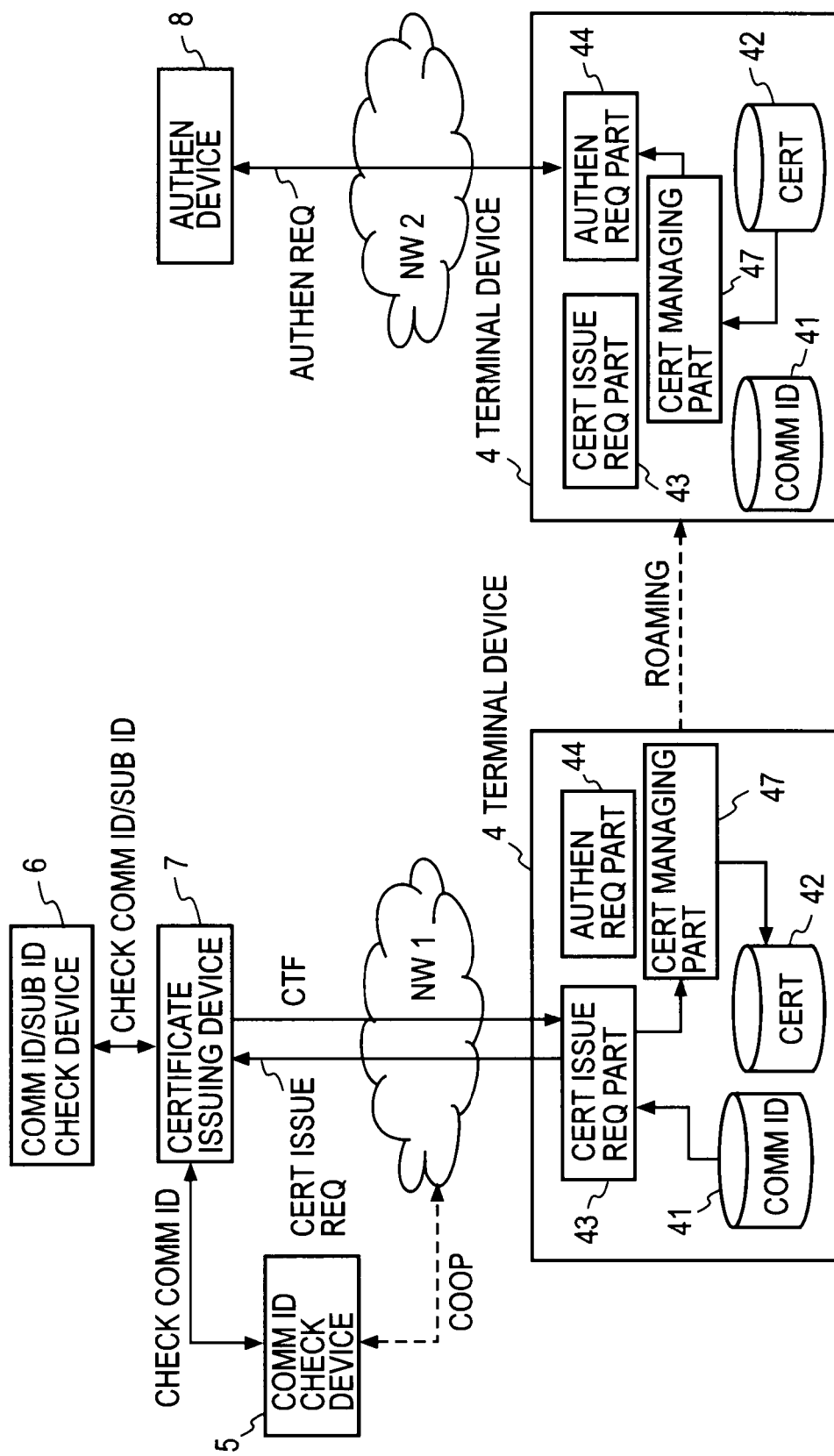
FIG. 16 is a block diagram showing a configuration of a certificate issuing system according to an eighth embodiment of the present invention.

FIG. 16 shows a configuration of a certificate issuing system according to the eighth embodiment of the present invention. As with the system according to the first embodiment shown in FIG. 1, the terminal device 4 has the communication ID storing part 41, the certificate storing part 42, the certificate issue requesting part 43 and the authentication requesting part 44. According to this embodiment, the terminal device 4 further has a certificate managing part 47 that manages the usage history of each certificate retained in the certificate storing part 42, such as the user, the destination of use, the location of use, the time of use and the purpose of use, and reads the optimal certificate to be transmitted to the authentication device 8 from the certificate storing part 42 based on the usage history and the application described in the certificate itself.

The configuration of the certificate issuing system according to this embodiment is the same as in the first embodiment except the points described above.

According to this embodiment, when a plurality of certificates is retained in the certificate storing part 42, an optimal one can be selected semi-automatically. Of course, this embodiment can be applied to the second to seventh embodiments.

Ninth Embodiment

According to a ninth embodiment of the present invention, in the first embodiment described earlier, the terminal device 4 can retain the certificate with higher security.

Figure 17:
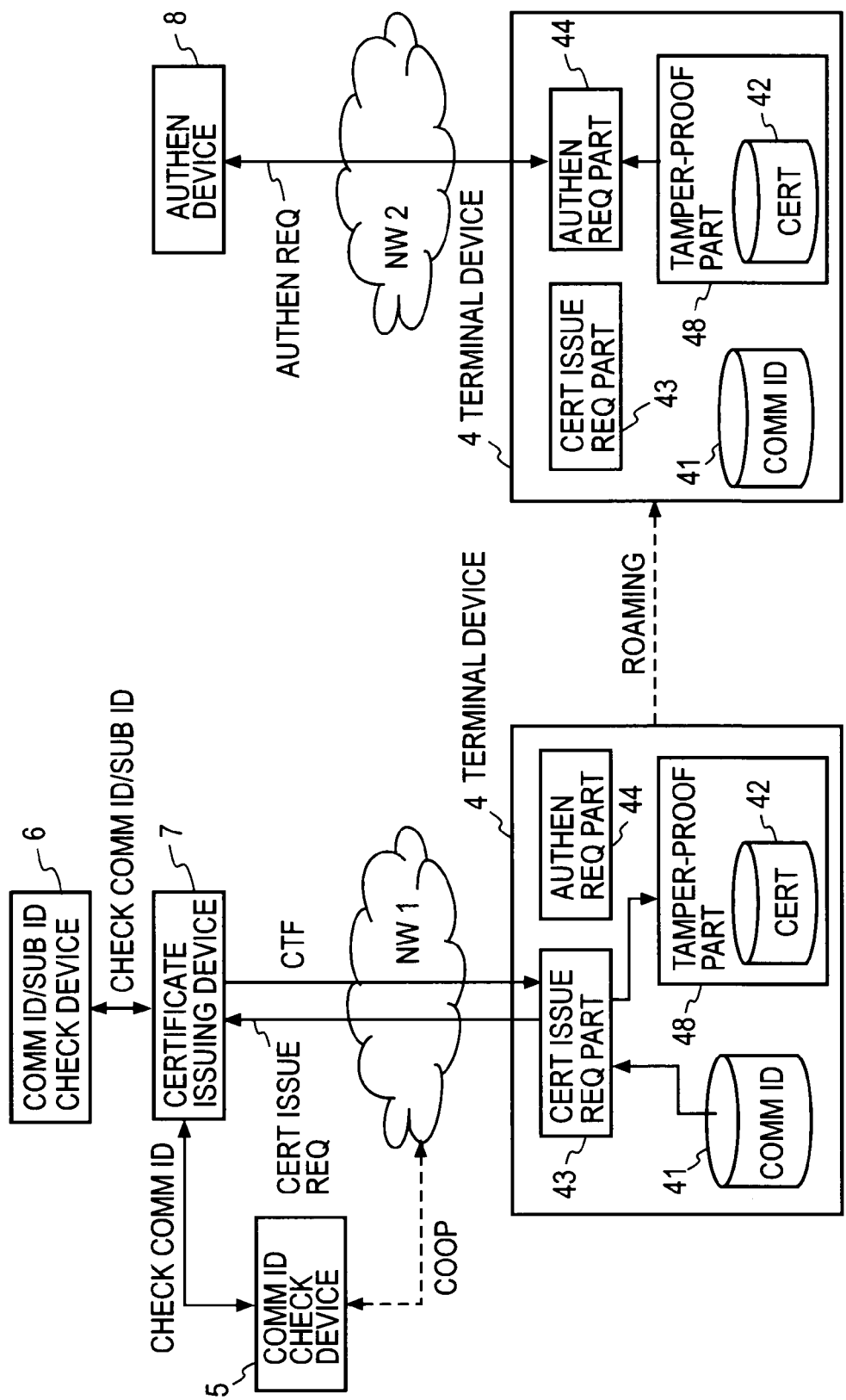
FIG. 17 is a block diagram showing a configuration of a certificate issuing system according to a ninth embodiment of the present invention.

FIG. 17 shows a configuration of a certificate issuing system according to the ninth embodiment of the present invention. As with the terminal device 4 in the system according to the first embodiment, the terminal device 4 has the communication ID storing part 41, the certificate storing part 42, the certificate issue requesting part 43 and the authentication requesting part 44. According to the embodiment shown in FIG. 17, the terminal device 4 further has a tamper-proof part 48, and the certificate storing part 42 is provided in the tamper-proof part 48. The tamper-proof part 48 is a device, such as a trusted platform module (TPM) and a subscriber identification module (SIM), or an IC card, for example.

The configuration of the certificate issuing system according to this embodiment is the same as in the first embodiment except the points described above.

According to this embodiment, the certificate and the key pair, the public key and the private key of the terminal device 4, are retained in the tamper-proof part 48, and therefore, the contents thereof cannot be tampered by an external third party as well as the user himself/herself. Therefore, the reliability of the certificate is improved. Of course, this embodiment can be applied to the second to eighth embodiments.

Tenth Embodiment

In a tenth embodiment of the present invention, there will be described a specific method of checking the association between the sub ID and the communication ID by the communication ID/sub ID checking device 6 in the first embodiment described earlier.

Figure 18:
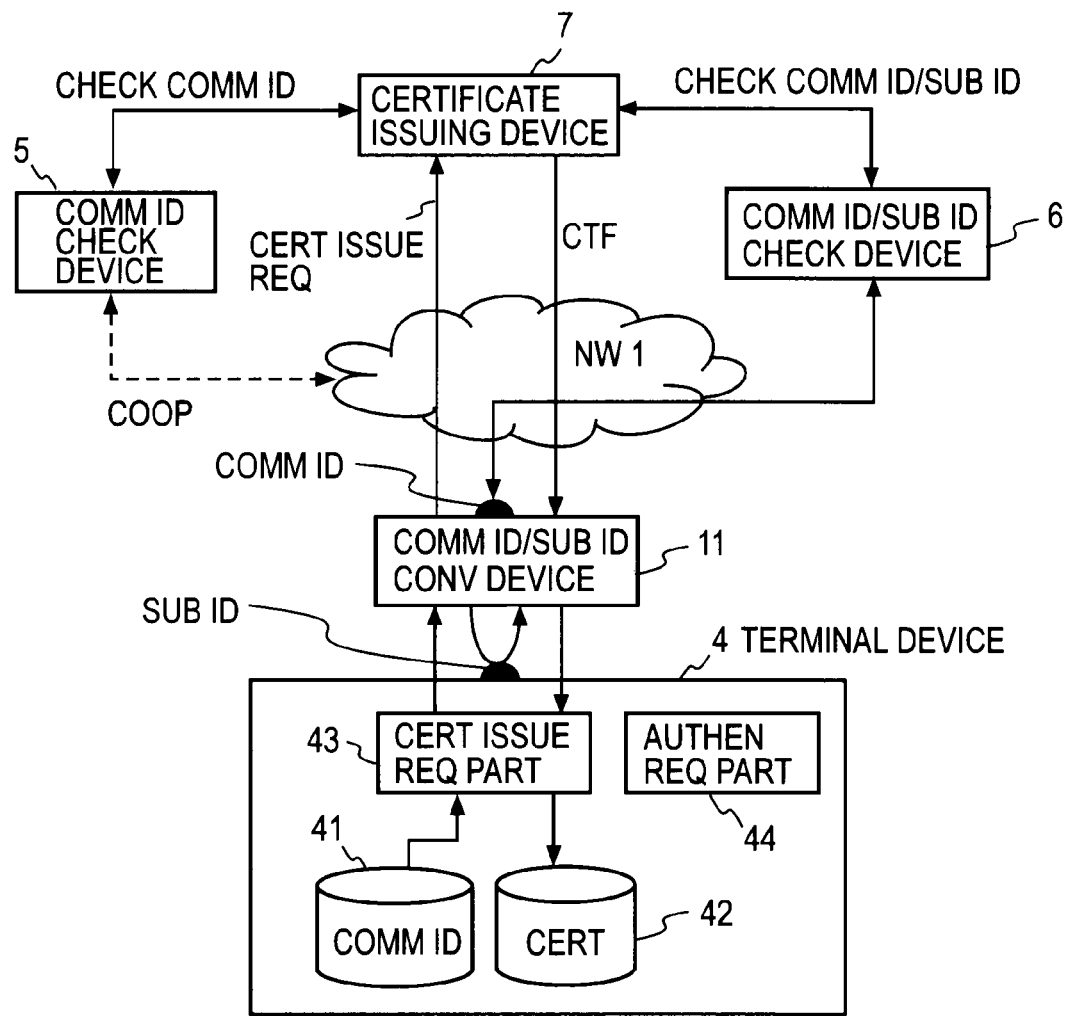
FIG. 18 is a block diagram showing a configuration of a certificate issuing system according to a tenth embodiment of the present invention.

FIG. 18 shows a configuration of a certificate issuing system according to a tenth embodiment of the present invention. The certificate issuing system differs from the system according to the first embodiment in that the terminal device 4 is connected to the NW1 via a communication ID/sub ID converting device 11. The communication ID/sub ID checking device 6 checks whether or not a predetermined sub ID and a predetermined communication ID on the NW1 are associated with each other in cooperation with the communication ID/sub ID converting device 11 disposed between the terminal device 4 and the NW1. The communication ID/sub ID converting device 11 is a PBX, a HGW or the like that carries out conversion between a master number and a sub number and conversion between a private IP address and a global IP address.

The configuration of the certificate issuing system according to this embodiment is the same as in the first embodiment except the points described above.

Figure 19:
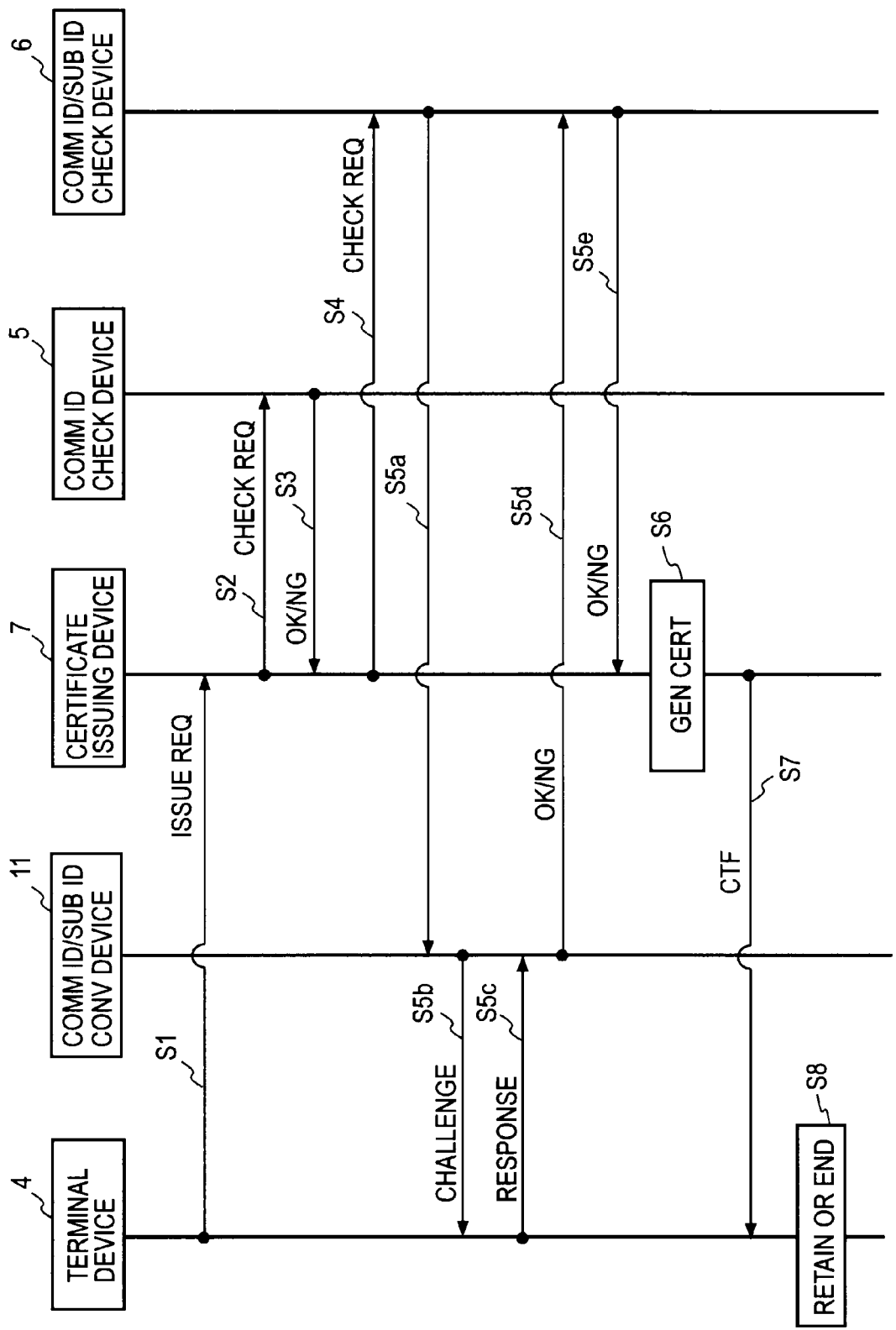
FIG. 19 is a sequence diagram for illustrating a main flow of a certificate issuing process of the certificate issuing system according to the tenth embodiment of the present invention.

FIG. 19 is a diagram for illustrating a main flow of a certificate issuing process of the certificate issuing system according to the tenth embodiment of the present invention. In the following, the certificate issuing process will be described in detail.

The certificate issuing device 7 receives the certificate issue request from the terminal device 4 (step S1), inquires of the communication ID checking device 5 whether or not the communication ID is in use (steps S2 and S3), and then requests the communication ID/sub ID checking device 6 to check whether or not the communication ID and the sub ID included in the certificate issue request are associated with each other (step S4).

In response to the request from the certificate issuing device 7, the communication ID/sub ID checking device 6 transmits a check request for checking whether or not the communication ID and the sub ID included in the certificate issue request are associated with each other to the communication ID/sub ID converting device 11 via the NW1 (step S5a).

The communication ID/sub ID converting device 11 receives the request from the communication ID/sub ID checking device 6, carries out the challenge and response check on the terminal device 4 having the sub ID included in the certificate issue request as described above (steps S5b and S5c), and transmits the OK check result to the communication ID/sub ID checking device 6 via the NW1 if the check succeeds or the NG check result to the communication ID/sub ID checking device 6 via the NW1 if the check fails (step S5d).

The communication ID/sub ID checking device 6 transmits the check result received from the communication ID/sub ID converting device 11 to the certificate issuing device 7 (step S5e).

The following operation is the same as in the first embodiment.

Figure 20:
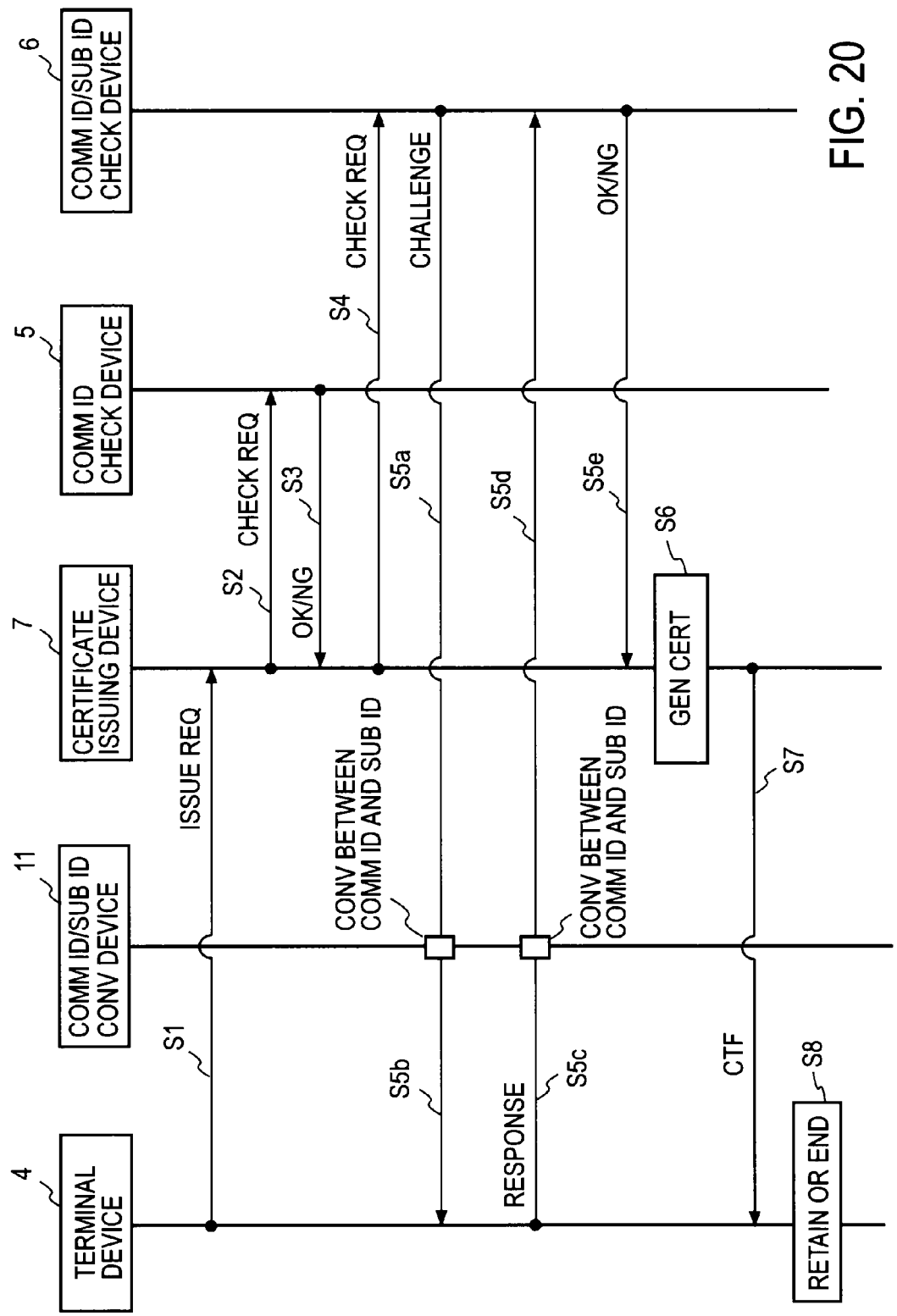
FIG. 20 is a sequence diagram for illustrating a main flow of another certificate issuing process of the certificate issuing system according to the tenth embodiment of the present invention.

FIG. 20 is a diagram for illustrating a main flow of another certificate issuing process of the certificate issuing system according to the tenth embodiment of the present invention. In the following, the certificate issuing process will be described in detail.

The certificate issuing device 7 receives the certificate issue request from the terminal device 4 (step S1), inquires of the communication ID checking device 5 whether or not the communication ID is in use (steps S2 and S3), and then requests the communication ID/sub ID checking device 6 to check whether or not the communication ID and the sub ID included in the certificate issue request are associated with each other (step S4).

In response to the request from the certificate issuing device 7, the communication ID/sub ID checking device 6 transmits a check request for checking the terminal device 4, which includes a challenge and is destined for the communication ID included in the certificate issue request, to the communication ID/sub ID converting device 11 via the NW1 (step S5a).

The communication ID/sub ID converting device 11 automatically converts the destination of the check request from the communication ID to the sub ID and transmits the check request to the terminal device 4 (step S5b).

When the terminal device 4 receives the check request, the terminal device 4 calculates the response to the challenge, and transmits a reply including at least the response and the public key to the communication ID/sub ID converting device 11 (step S5c).

The communication ID/sub ID converting device 11 automatically converts the sub ID of the source of the reply to the communication ID and transmits the reply to the communication ID/sub ID checking device 6 via the NW1 (step S5d).

When the communication ID/sub ID checking device 6 receives the reply to the check request concerning the terminal device 4 from the communication ID/sub ID converting device 11, the communication ID/sub ID checking device 6 validates the response to the challenge and transmits the OK check result to the certificate issuing device 7 if the response is proper (step S5e).

The following operation is the same as in the first embodiment.

Figure 21:
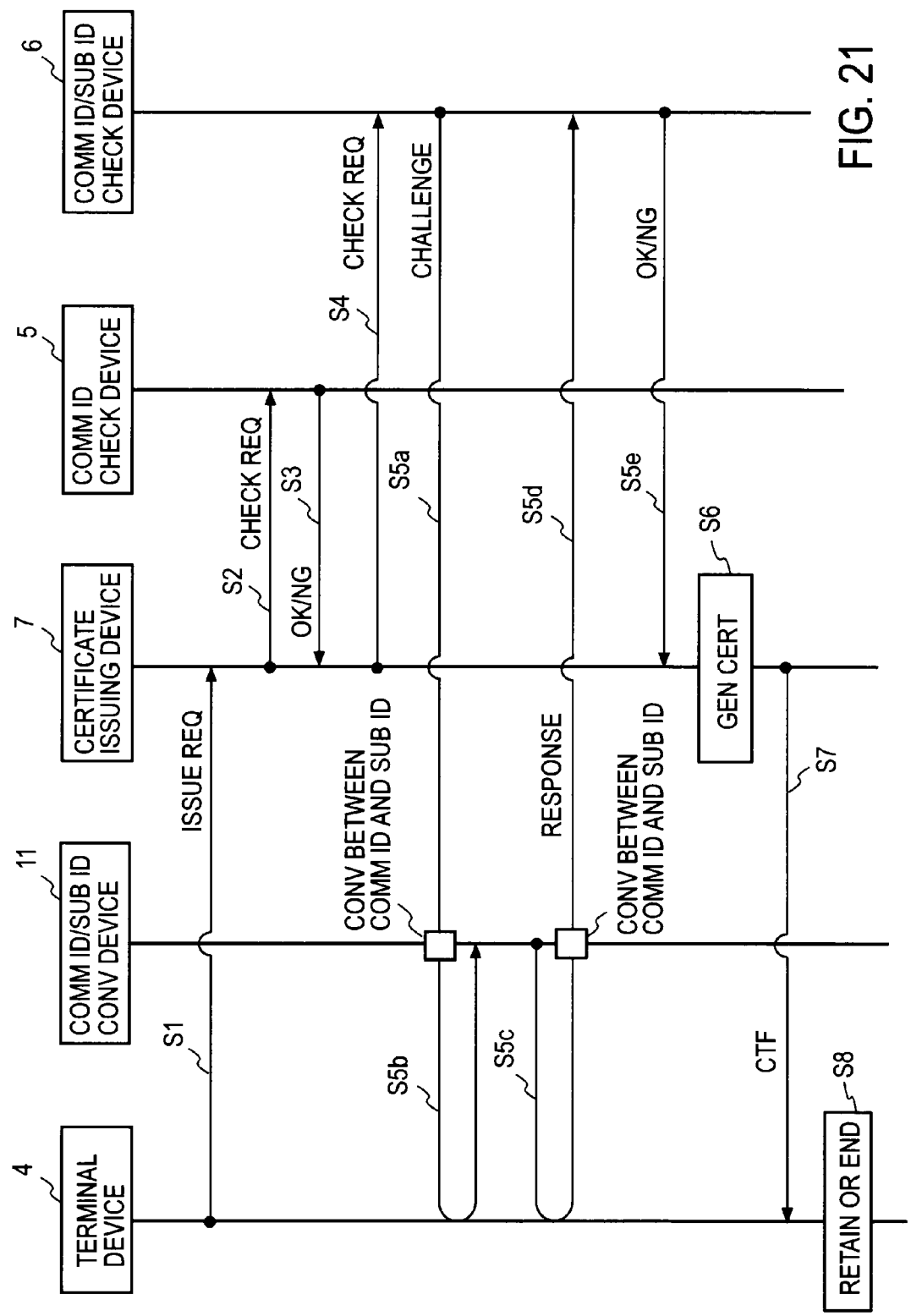
FIG. 21 is a sequence diagram for illustrating a main flow of another certificate issuing process of the certificate issuing system according to the tenth embodiment of the present invention.

Furthermore, FIG. 21 is a diagram for illustrating a main flow of another certificate issuing process of the certificate issuing system according to the tenth embodiment of the present invention. In the following, the certificate issuing process will be described in detail.

The certificate issuing device 7 receives the certificate issue request from the terminal device 4 (step S1), inquires of the communication ID checking device 5 whether or not the communication ID is in use (steps S2 and S3), and then requests the communication ID/sub ID checking device 6 to check whether or not the communication ID and the sub ID included in the certificate issue request are associated with each other (step S4).

In response to the request from the certificate issuing device 7, the communication ID/sub ID checking device 6 transmits a check request for checking the terminal device 4, which includes a challenge and is destined for the communication ID included in the certificate issue request, to the communication ID/sub ID converting device 11 via the NW1 (step S5a).

The communication ID/sub ID converting device 11 automatically converts the destination of the check request from the communication ID to the sub ID and transmits the check request to the terminal device 4 (step S5b).

When the terminal device 4 receives the check request, the terminal device 4 forwards (redirects) the check request to the communication ID/sub ID converting device 11.

When the communication ID/sub ID converting device 11 receives the check request, the communication ID/sub ID converting device 11 calculates the response to the challenge, and transmits a reply including at least the response and the public key to the terminal device 4 (step S5c).

When the terminal device 4 receives the reply, the terminal device 4 forwards (redirects) the reply to the communication ID/sub ID converting device 11. The communication ID/sub ID converting device 11 automatically converts the source of the reply from the sub ID to the communication ID and transmits the reply to the communication ID/sub ID checking device 6 via the NW1 (step S5d).

When the communication ID/sub ID checking device 6 receives the reply to the check request concerning the terminal device 4 from the communication ID/sub ID converting device 11, the communication ID/sub ID checking device 6 transmits the OK check result to the certificate issuing device 7 (step S5e).

The following operation is the same as in the first embodiment. The certificate authentication process is the same as in the first embodiment.

According to this embodiment, it can be checked whether or not a predetermined sub ID and a predetermined communication ID on a particular network are associated with each other by using the communication ID/sub ID converting device 11 disposed between the terminal device 4 and the NW1. Of course, this embodiment can be applied to the second to ninth embodiments.

Eleventh Embodiment

According to an eleventh embodiment of the present invention, in the first embodiment described above, issue of the certificate is charged.

Figure 22:
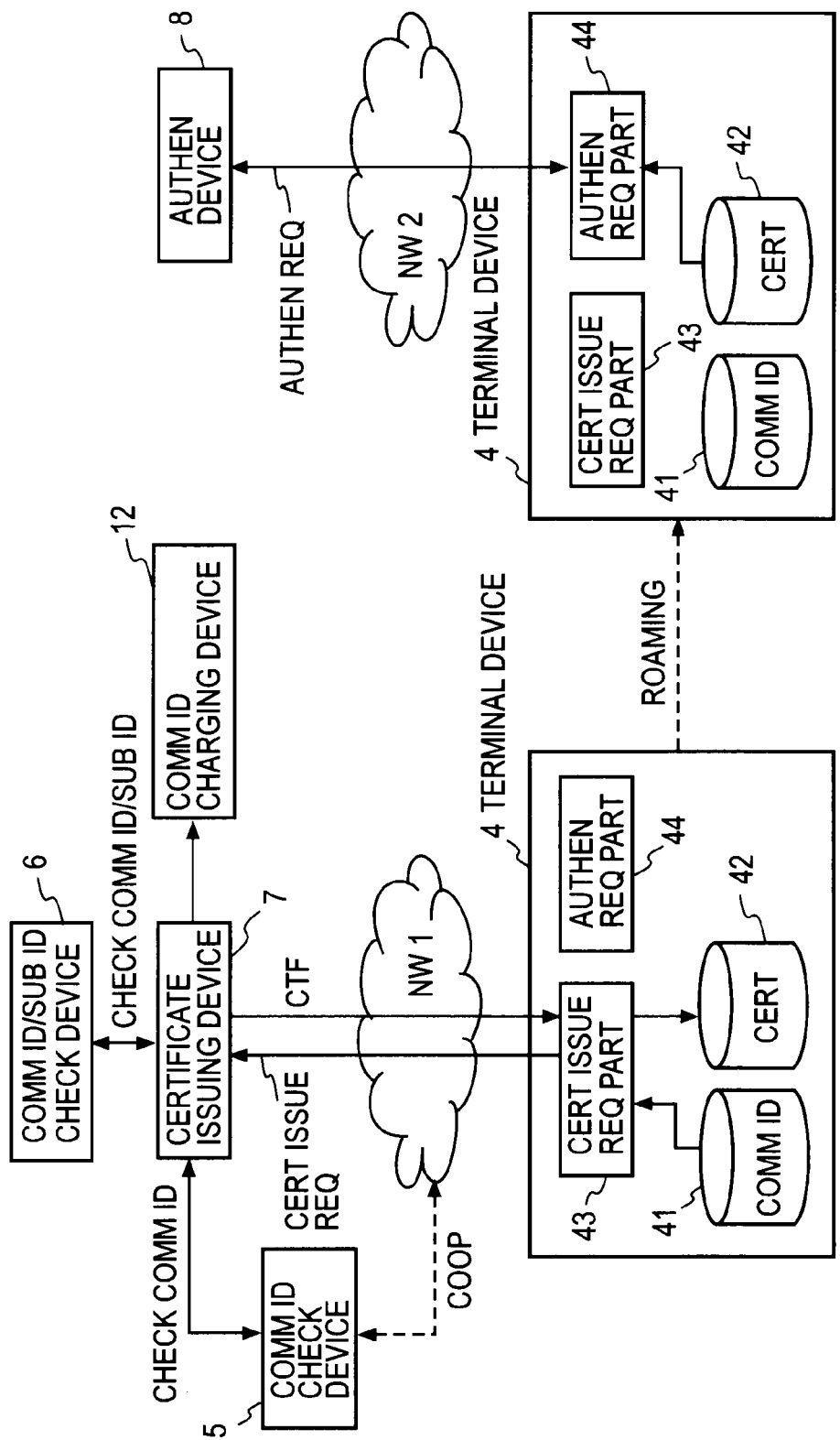
FIG. 22 is a block diagram showing a configuration of a certificate issuing system according to an eleventh embodiment of the present invention.

FIG. 22 shows a configuration of a certificate issuing system according to the eleventh embodiment of the present invention. The certificate issuing system differs from the system according to the first embodiment in that a communication ID charging device 12 that checks the charging to the terminal device in response to a request for check of the bill of the charge to a predetermined communication ID and checks the credit in response to a request for billing of the charge to the predetermined communication ID is provided on a previously determined network.

The certificate issuing device 7 further has a communication ID charge checking part 7G as shown by the dashed line in FIG. 2A. When the communication ID charge checking part 7G receives the certificate issue request from the terminal device 4 via the NW1, the certificate issuing device 7 checks whether or not the communication ID included in the certificate issue request is in use and whether or not the communication ID and the sub ID are associated with each other, as in the first embodiment. If both the check results are OK, the certificate issuing device 7 requests the communication ID charging device 12 to check the bill of the charge involved in the issue of the certificate to the communication ID included in the certificate issue request and to bill the charge. If both the replies from the communication ID charging device 12 are OK, the certificate issuing device 7 generates a certificate CTF including at least the ID of the certificate issuing device 7, the communication ID of the terminal device 4, the sub ID and the validity period and transmits the certificate CTF to the terminal device 4 via the NW1.

The configuration of the certificate issuing system according to this embodiment is the same as in the first embodiment except the points described above.

Figure 23:
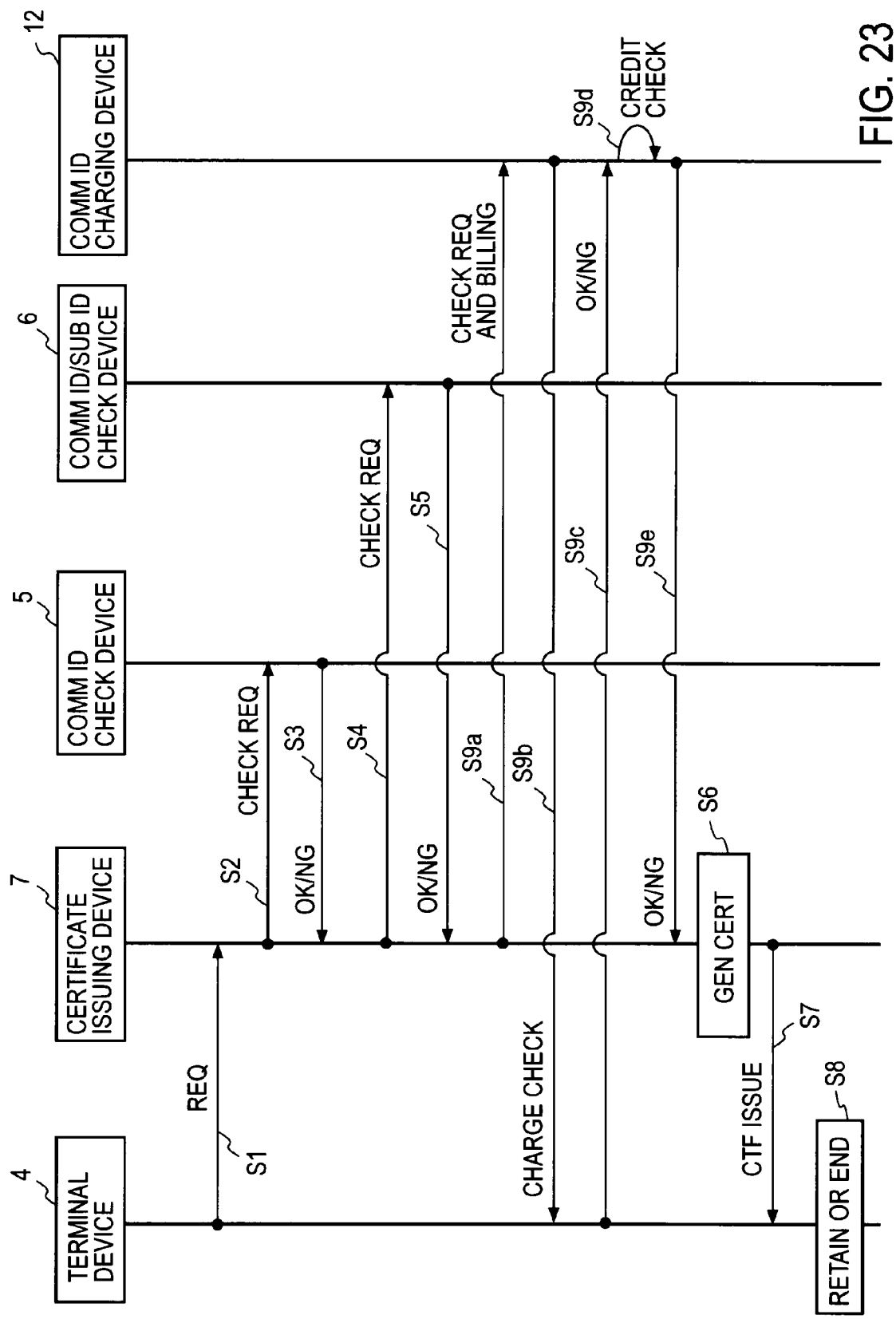
FIG. 23 is a sequence diagram for illustrating a main flow of a certificate issuing process of the certificate issuing system according to the eleventh embodiment of the present invention.

FIG. 23 is a diagram for illustrating a main flow of a certificate issuing process of the certificate issuing system according to the eleventh embodiment of the present invention. In the following, the certificate issuing process will be described in detail.

After the terminal device 4 transmits the certificate issue request to the certificate issuing device 7 (step S1), the certificate issuing device 7 receives the check results from the communication ID checking device 5 and the communication ID/sub ID checking device 6 (steps S2 to S5). If both the check results are OK, the certificate issuing device 7 requests the communication ID charging device 12 to check the bill of the charge involved in the issue of the certificate to the communication ID included in the certificate issue request and to bill the charge (step S9a).

In response to the request from the certificate issuing device 7, the communication ID charging device 12 requests the terminal device 4 to check the charging involved in the issue of the certificate (step S9b). If the reply from the terminal device 4 is OK (step S9c), the communication ID charging device 12 checks the credit of the communication ID or, in other words, checks the balance of the account at a banking institution associated with the communication ID (step S9d) and transmits the check result to the certificate issuing device 7 (step S9e).

If both the replies from the communication ID charging device 12 concerning the check of the bill of the charge and the billing of the charge are OK, the certificate issuing device 7 generates a certificate CTF including at least the ID of the certificate issuing device 7, the communication ID, the sub ID and the validity period (step S6) and transmits the certificate CTF to the terminal device 4 via the NW1 (step S7).

The certificate authentication process is the same as in the first embodiment.

According to this embodiment, issue of a certificate to the communication ID included in the certificate can be charged, and thus, a service that sells a certificate as a paid ticket can be offered. Of course, this embodiment can be applied to the second to tenth embodiments.

Twelfth Embodiment

According to a twelfth embodiment, in the eleventh embodiment described above, a network that is the source of a certificate can be billed for the charge involved in the authentication of the certificate.

Figure 24:
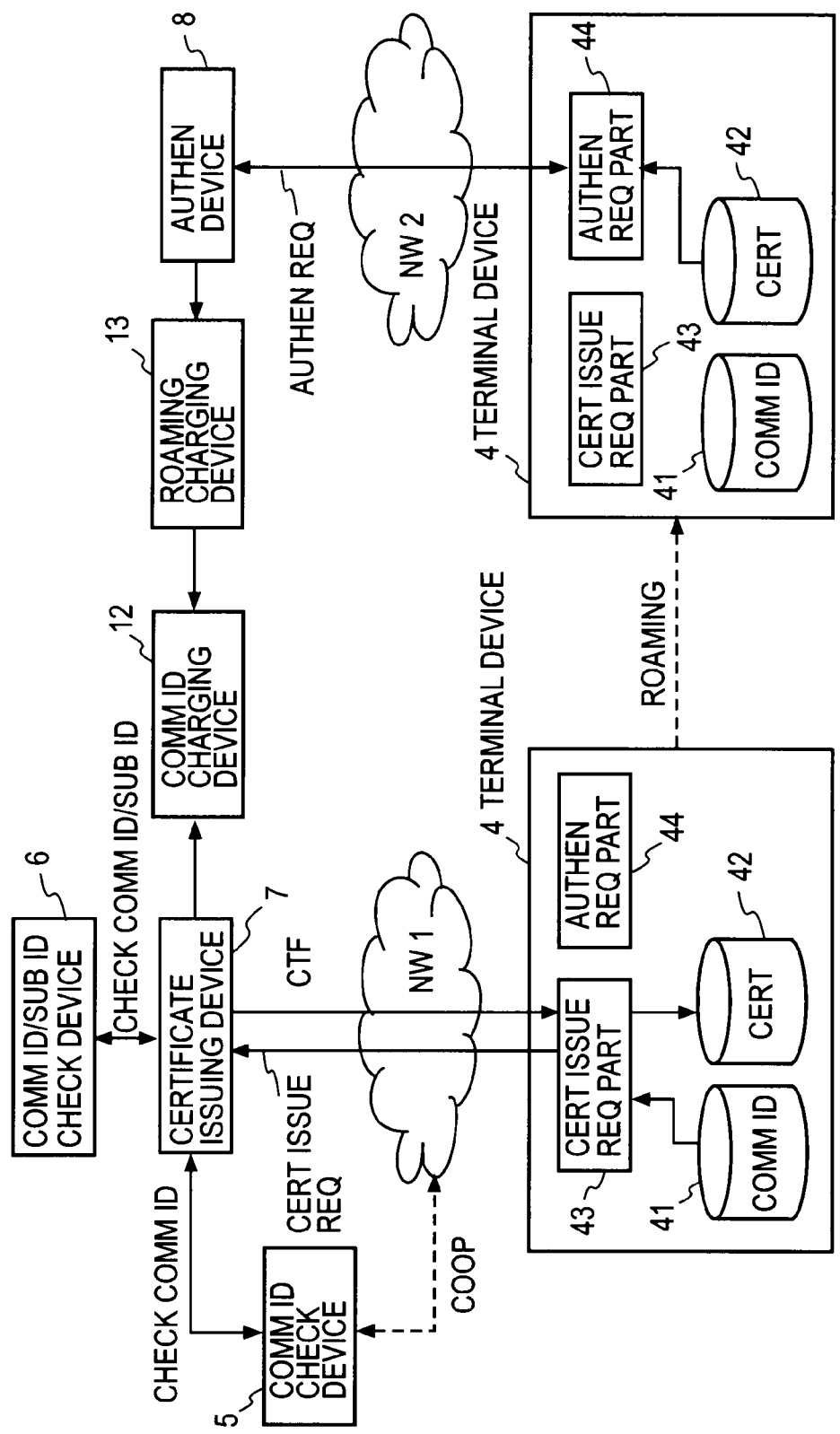
FIG. 24 is a block diagram showing a configuration of a certificate issuing system according to a twelfth embodiment of the present invention.

FIG. 24 shows a configuration of a certificate issuing system according to the twelfth embodiment of the present invention. The certificate issuing system differs from the system according to the eleventh embodiment in that a roaming charging device 13 that forwards the request for check of the bill of the charge involved in the authentication of the certificate and the request for billing of the charge to the network NW1 associated with the communication ID included in the certificate and receives the replies to the requests is provided on a previously determined network.

The authentication device 8 further has a roaming charging checking part 8G as shown by the dashed line in FIG. 2C. When the authentication device 8 receives the authentication request from the terminal device 4 via the NW2, the authentication device 8 checks the terminal device, the certificate and the validity period as in the first embodiment and then requests the roaming charging device 13 to check the bill of the charge involved in the authentication of the certificate and to bill the charge. If both the replies from the roaming charging device 13 are OK, the authentication device 8 transmits the OK authentication result to the terminal device 4 via the NW2.

The configuration of the certificate issuing system according to this embodiment is the same as in the eleventh embodiment except the points described above.

Figure 25:
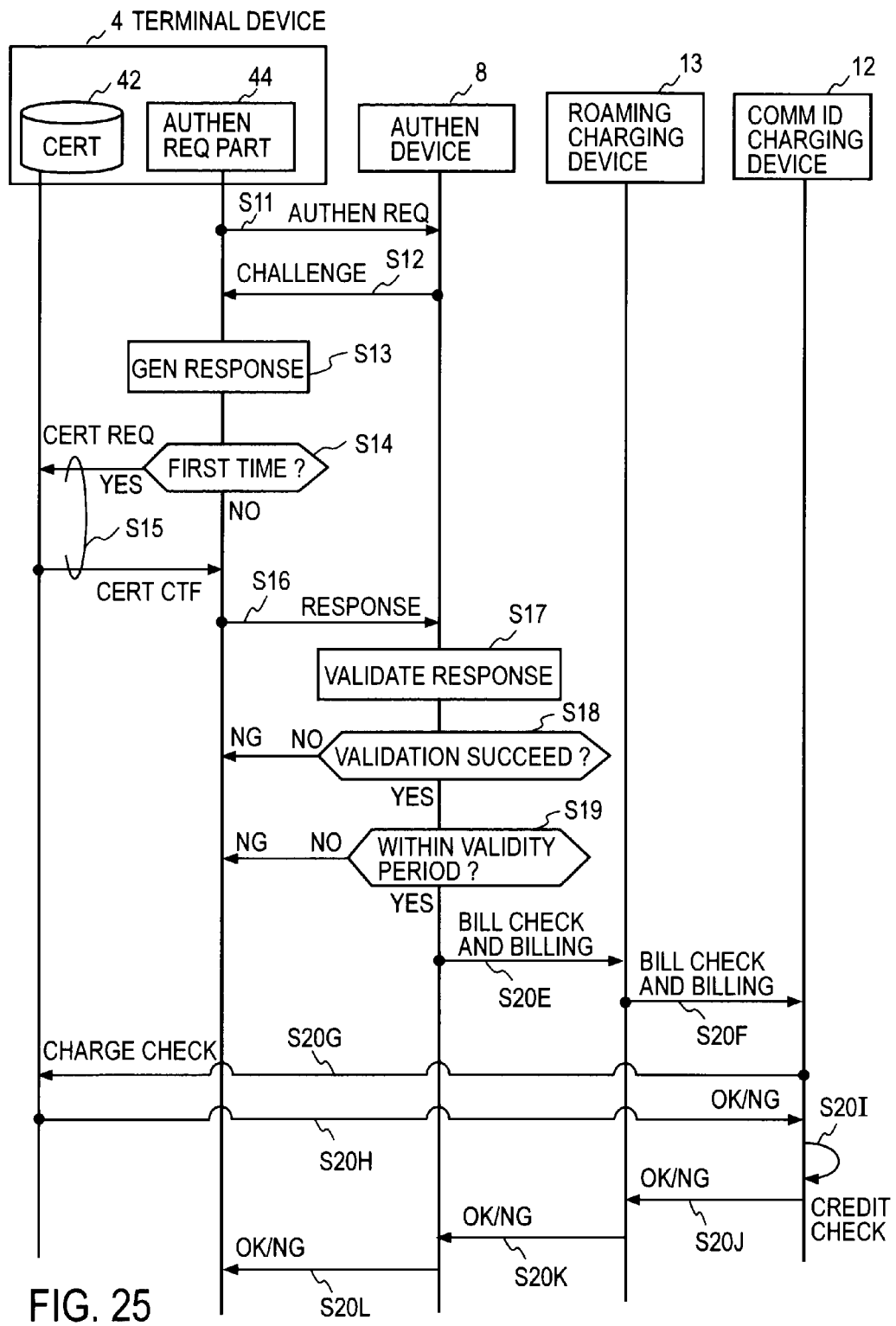
FIG. 25 is a sequence diagram for illustrating a main flow of a certificate authentication process of the certificate issuing system according to the twelfth embodiment of the present invention.

FIG. 25 is a diagram for illustrating a main flow of a certificate authentication process of the certificate issuing system according to the twelfth embodiment of the present invention. In the following, the certificate authentication process will be described in detail.

From where the terminal device 4 transmits the authentication request to the authentication device 8, up to where the authentication device 8 validates the response (steps S11 to S18), the process is the same as the process shown in FIG. 12.

If it is determined in step S18 that the validation succeeds, and it is determined in step S19 that the validity period is not expired, the authentication device 8 requests the roaming charging device 13 to check the bill of the charge involved in the authentication of the certificate CTF including the communication ID and to bill the charge (step S20E).

The roaming charging device 13 forwards the requests for checking the bill of the charge and for billing the charge to the communication ID charging device 12 on the network NW1 associated with the communication ID included in the certificate (step S20F).

In response to the requests from the roaming charging device 13, the communication ID charging device 12 requests the terminal device 4 to check the charging involved in the authentication of the certificate (step S20G). If the terminal device 4 responds by an OK reply (step S20H), the communication ID charging device 12 further checks the credit of the communication ID or, in other words, checks the balance of the account at a banking institution associated with the communication ID (step S20I) and transmits the check result to the roaming charging device 13 (step S20J).

The roaming charging device 13 forwards the check results concerning the check of the bill of the charge and the billing of the charge to the authentication device 8 (step S20K).

The authentication device 8 transmits the OK authentication result to the terminal device 4 via the NW2 if both the replies concerning the check of the bill of the charge and the billing from the roaming charging device 13 are OK, or otherwise, transmits the NG authentication result to the terminal device 4 via the NW2 (step S20L).

According to this embodiment, the fee for the roaming service to access the NW2 by using the certificate issued on the NW1 can be charged on the NW1.

Another Embodiment

In the embodiments described above, the terminal device 4 transmits a certificate issue request and a certificate expiration request that include at least the sub ID thereof, and the certificate issue request and the certificate expiration request include both the communication ID and the sub ID when the requests finally reach the certificate issuing device 7. However, the certificate issue request and the certificate expiration request may include only the communication ID when the requests finally reach the certificate issuing device 7.

In such a case, the communication ID included in the certificate issue request and the certificate expiration request may be read from the communication ID storing part 41 by the certificate issue requesting part 43 in the terminal device 4 and added to the requests or may be added to the requests by the communication ID adding device 9 on the NW1 as described in the fourth embodiment.

When the certificate issuing device 7 receives the certificate issue request including only the communication ID from the terminal device 4 via the NW1, the certificate issuing device 7 requests the communication ID checking device 5 to check whether or not the communication ID included in the certificate issue request is in use. If the check result from the communication ID checking device 5 is OK, the certificate issuing device 7 generates a certificate CTF including at least the ID of the certificate issuing device 7, the communication ID of the terminal device 4 and the validity period and transmits the certificate CTF to the terminal device 4 via the NW1. When the certificate issuing device 7 receives the certificate expiration request including only the communication ID from the terminal device 4 via the NW1, the certificate issuing device 7 requests the communication ID checking device 5 to check whether or not the communication ID included in the certificate expiration request is in use. If the check result from the communication ID checking device 5 is OK, the certificate issuing device 7 generates expiration information on the certificate CTF including the communication ID and additionally registers the expiration information in the expiration information storing device 10.

The certificate issuing process and the certificate authentication process are basically the same as in the first embodiment except that the communication ID/sub ID checking device 6 is not accessed. The certificate expiration process and the certificate authentication process involved therein are also basically the same as in the seventh embodiment except that the communication ID/sub ID checking device 6 is not accessed.

According to this embodiment, on a basis of the sub network to which the terminal device 4 belongs rather than on a basis of the terminal device itself, a certificate having a short validity period is issued without the need of identification of the user. Therefore, the authentication device 8 connected to the NW2, which is different from the NW1 to which the certificate issuing device 7 is connected, can carry out authentication. Therefore, even if the original communication ID cannot be used, for example, even if the terminal device 4 is roaming, various services can be used.

What is claimed is:

1. A certificate authenticating method that authenticates a terminal device capable of connecting to a first network by using a communication ID to allow the terminal device to connect a second network different from the first network, the terminal device having a sub ID, wherein ID is an abbreviation of identifier, comprising:
(a) a step by the terminal device of transmitting, via the first network, a certificate issue request including at least the communication ID and the sub ID to a certificate issuing device connected to the first network, the communication ID being a global IP address and the sub ID being a private IP address;
(b) a step by the certificate issuing device of requesting a communication ID checking device to check whether or not the communication ID of the terminal device included in the certificate issue request is in use when the certificate issue request is received from the terminal device via the first network, requesting a communication ID/sub ID checking device to check whether or not the association between the communication ID and the sub ID is proper, generating a certificate including at least an ID of the certificate issuing device, the communication ID and the sub ID of the terminal device and a validity period if at least the check results from the communication ID checking device and the communication ID/sub ID checking device are OK, and transmitting the certificate to the terminal device;

(c) a step by the terminal device of transmitting an authentication request including at least the sub ID for authentication of the certificate to an authentication device on the second network; and (d) a step by the authentication device of carrying out authentication of the certificate in response to the authentication request.

2. The certificate authenticating method according to claim 1, wherein the step (d) further comprises:

a step (d-1) of generating a challenge, storing the challenge and transmitting the challenge to the terminal device via the second network when the authentication request is received;

the step (c) further comprises a step (c-1) of generating a response to the challenge using a private key of the terminal device when a challenge is received from the authentication device via the second network; and a step (c-2) of transmitting the response, a public key of the terminal device and the certificate to the authentication device via the second network, and the step (d) further comprises a step (d-2) of receiving the certificate along with a response to the challenge and the public key of the terminal device from the terminal device via the second network; and a step (d-3) of validating the received response using the public key of the terminal device and the stored challenge and transmitting a no-good authentication result to the terminal device via the second network if the validation fails or transmitting an OK authentication result to the terminal device via the second network if the validation succeeds and the validity period is not expired.

3. The certificate authenticating method according to claim 1, wherein the step (b) carried out by the certificate issuing device comprises:

a step of searching for a check result associated with the communication ID or the sub ID included in the certificate issue request that is retained in the certificate issuing device; and a step of, if the check result is not retained in the certificate issuing device, transmitting the check request to at least one of the communication ID checking device and the communication ID/sub ID checking device to obtain the check result, retaining the obtained check result and generating the certificate based on the check result or, if the check result is retained in the certificate issuing device, generating the certificate based on the retained check result.

4. The certificate authenticating method according to any one of claims 1, 2 and 3, wherein, in the step (b), said at least one of the communication ID checking device and the communication ID/sub ID checking device is requested via the terminal device to check at least either whether or not the communication ID included in the certificate issue request is in use or whether or not the communication ID and the sub ID included in the certificate issue request are associated with each other.

5. The certificate authenticating method according to any one of claims 1, 2 and 3, wherein the step (a) is a step by the terminal device of transmitting the certificate issue request including the communication ID of the terminal device to the certificate issuing device.

6. The certificate authenticating method according to any one of claims 1, 2 and 3, wherein the certificate issue request includes a second communication ID on a third network, and the step (b) carried out by the certificate issuing device is a step of transmitting the certificate to the terminal device via the third network by using the second communication ID.

7. The certificate authenticating method according to claim 2, wherein the step (d-3) carried out by the authentication device is a step of requesting at least one of the communication ID checking device and the communication ID/sub ID checking device to check at least one of the communication ID and the relationship between the communication ID and the sub ID if the validation of the response succeeds and the validity period is not expired and transmitting the OK authentication result to the terminal device via the second network if the check result is OK.

8. The certificate authenticating method according to claim 2 or 7, wherein there is provided an expiration information storing device that retains expiration information on the certificate associated with the communication ID or the sub ID of the terminal device generated by the certificate issuing device in response to a certificate expiration request from the terminal device, the method further comprises:

(e) a step by the certificate issuing device of requesting the communication ID checking device to check whether or not the communication ID included in a certificate expiration request is in use when the certificate expiration request including at least the communication ID is received from the terminal device via the first network, generating the expiration information on the certificate including at least the communication ID if the check result from the communication ID checking device is OK and retaining the expiration information in the expiration information storing device.

9. The certificate authenticating method according to claim 8, wherein the step (d-3) carried out by the authentication device comprises a step of checking whether or not the expiration information on the certificate associated with one of the communication ID and the sub ID included in the certificate is retained in the expiration information storing device, and a requirement for transmission of the OK authentication result to the terminal device is that the expiration information is not retained in the expiration information storing device.

10. The certificate authenticating method according to claim 2, wherein the terminal device has a plurality of issued certificates, and the step (c-2) comprises a step of selecting a certificate from among the plurality of issued certificates according to the usage history and application thereof and transmitting the selected certificate to the authentication device.

11. The certificate authenticating method according to any one of claims 1, 2 and 3, wherein the step (b) comprises a step by the communication ID/sub ID checking device of checking whether or not the sub ID and the communication ID are associated with each other in cooperation with a communication ID/sub ID converting device disposed between the terminal device and the first network.

12. The certificate authenticating method according to claim 2, wherein there is provided a communication ID charging device that checks the charging to the terminal device in response to a request for check of the bill of the charge to the communication ID and checks the credit in response to a request for billing of the charge to a predetermined communication ID, and the step (b) carried out by the certificate issuing device includes requesting the communication ID charging device to check the bill of the charge involved in the issue of the certificate to the communication ID included in the certificate issue request and to bill the charge after checking whether or not the communication ID included in the certificate issue request is in use and whether or not the communication ID and the sub ID are associated with each other and generating the certificate if both the replies from the communication ID charging device are OK.

13. The certificate authenticating method according to claim 12, wherein there is provided a roaming charging device that forwards the requests for check of the bill of the charge involved in the authentication of the certificate and billing of the charge to the communication ID charging device on the first network associated with the communication ID included in the certificate and receives a reply therefrom, and the step (d-3) carried out by the authentication device comprises a step of requesting the roaming charging device to check the bill of the charge involved in the authentication of the certificate to the communication ID included in the certificate and to bill the charge after checking the certificate of the terminal device and the validity period, and a requirement for transmission of the OK authentication result to the terminal device is that both the replies from the roaming charging device are OK.

14. A certificate issuing device that issues a certificate that allows a terminal device capable of connecting to a first network by using a communication ID to connect a second network, where ID is an abbreviation of identifier, comprising:

communication ID check requesting means that is configured to request a communication ID checking device on the first network to check whether or not the communication ID of the terminal device included in a certificate issue request is in use when the certificate issue request is received from the terminal device via the first network; and certificate generating means that is configured to generate a certificate including at least an ID of the certificate issuing device, the communication ID and a sub ID of the terminal device and a validity period if at least the check result from the communication ID checking device is OK and transmit the certificate to the terminal device; wherein the certificate issue request includes a sub ID of the terminal device, the certificate issuing device further comprises communication ID/sub ID check requesting means that is configured to request a communication ID/sub ID checking device on the first network to check whether or not the association between the communication ID and the sub ID is proper, and a requirement for the certificate generating means to generate the certificate is that the check result is positive, the communication ID being a global IP address and the sub ID being a private IP address.

15. The certificate issuing device according to claim 14, further comprising: storing means that is configured to retain a check result associated with the communication ID or the sub ID, wherein the certificate generating means is configured to search for a check result associated with the communication ID or the sub ID included in the certificate issue request that is retained in the storing means, and transmit the check request to at least one of the communication ID checking device and the communication ID/sub ID checking device to obtain the check result, retain the obtained check result, and generate the certificate based on the check result if the check result is not retained, or generate the certificate based on the retained check result if the check result is retained in the certificate issuing device.

16. The certificate issuing device according to claim 14 or 15, wherein the communication ID check requesting means is configured to request the communication ID checking device to check whether or not the communication ID included in a certificate expiration request is in use when the certificate expiration request including at least the communication ID is received from the terminal device via the first network, and the certificate issuing device further comprises certificate expiration information generating means that is configured to generate expiration information on the certificate including at least the communication ID if the check result from the communication ID checking device is OK and transmit the expiration information to an expiration information storing device on a previously determined third network to retain the expiration information in the expiration information storing device.

17. The certificate issuing device according to claim 16, wherein the certificate generating means is configured to request a communication ID charging device on a previously determined fourth network to check the bill of the charge involved in the issue of the certificate to the communication ID included in the certificate issue request and to bill the charge after it is checked whether or not the communication ID included in the certificate issue request is in use and whether or not the communication ID and the sub ID are associated with each other and generates the certificate if both the replies from the communication ID charging device are OK.

18. The certificate issuing device according to claim 14 or 15, wherein the certificate generating means is configured to request a communication ID charging device on a previously determined fourth network to check the bill of the charge involved in the issue of the certificate to the communication ID included in the certificate issue request and to bill the charge after it is checked whether or not the communication ID included in the certificate issue request is in use and whether or not the communication ID and the sub ID are associated with each other and generates the certificate if both the replies from the communication ID charging device are OK.

19. An authentication device that authenticates a terminal device capable of connecting to a first network by using a communication ID to allow the terminal device to connect to a second network, where ID is an abbreviation of identifier, comprising:

storing means;

challenge generating means that is configured to generate a challenge in response to reception of an authentication request including at least a sub ID of the terminal device from the terminal device via the second network, retain the challenge in the storing means and transmits the challenge to the terminal device via the second network;

response validating means that is configured to receive a response to the challenge, a public key of the terminal device and a certificate including at least a communication ID, the sub ID and a validity period from the terminal device via the second network and validate the response using the public key of the terminal device and the challenge retained in the storing means, the communication ID being a global IP address and the sub ID being a private IP address; and validity period determining means that is configured to determine whether or not the validity period of the certificate is expired;

wherein the authentication device is configured to transmits an OK authentication result to the terminal device via the second network if the validation succeeds and if it is determined that the validity period is not expired, to thereby allow the terminal device to connect to the second network using the sub ID.

20. The authentication device according to claim 19, wherein the authentication device is configured to request at least one of a communication ID checking device and a communication ID/sub ID checking device via a previously determined third network to check at least one of the communication ID and the relationship between the communication ID and the sub ID if the validation of the response succeeds and the validity period is not expired, and transmit the OK authentication result to the terminal device via the second network if the check result is OK.

21. The authentication device according to claim 19, further comprising an expiration information checking means that is configured to check whether or not expiration information on a certificate associated with one of the communication ID and the sub ID included in the certificate is retained in an expiration information storing device on a previously determined third network, wherein a requirement for transmission of the OK authentication result to the terminal device is that the expiration information is not retained.

22. The authentication device according to claim 19, wherein the authentication device is configured to request a roaming charging device on a previously determined third network to check the bill of the charge involved in the authentication of the certificate to the communication ID included in the certificate and to bill the charge, and another requirement for transmission of the OK authentication result to the terminal device is that both the replies from the roaming charging device are OK.

* * * * *